US 7,765,484 B2
Jul. 27, 2010

(12) United States Patent
Roskind

(54) PASSIVE PERSONALIZATION OF LISTS

(75) Inventor: James A. Roskind, Redwood City, CA (US)

(73) Assignee: AOL Inc., Dulles, VA (US)

( * ) Notice: Subject to any disclaimer, the term of this patent is extended or adjusted under 35 U.S.C. 154(b) by 1148 days.

(21) Appl. No.: 10/134,437

(22) Filed: Apr. 30, 2002

(65) Prior Publication Data
US 2003/0065721 A1    Apr. 3, 2003

Related U.S. Application Data

(60) Provisional application No. 60/325,084, filed on Sep. 28, 2001.

(51) Int. Cl.
G06F 3/00    (2006.01)

(52) U.S. Cl. .................. 715/752; 715/758; 715/772; 715/811

(58) Field of Classification Search .................. 715/758
See application file for complete search history.

(56) References Cited

U.S. PATENT DOCUMENTS

| | | |
|---|---|---|
| 4,837,798 A | 6/1989 | Cohen et al. |
| 5,086,394 A | 2/1992 | Shapira |
| 5,276,905 A | 1/1994 | Hurst et al. |
| 5,327,486 A | 7/1994 | Wolff et al. |
| 5,533,110 A | 7/1996 | Pinard et al. |
| 5,548,637 A | 8/1996 | Heller et al. |
| 5,557,659 A | 9/1996 | Hyde-Thomson |
| 5,608,786 A | 3/1997 | Gordon |
| 5,694,616 A | 12/1997 | Johnson et al. |
| 5,721,906 A | 2/1998 | Siefert |
| 5,742,905 A | 4/1998 | Pepe et al. |
| 5,774,670 A | 6/1998 | Montulli |
| 5,793,365 A | 8/1998 | Tang et al. |
| 5,802,470 A | 9/1998 | Gaulke et al. |
| 5,850,594 A | 12/1998 | Cannon et al. |
| 5,867,162 A * | 2/1999 | O'Leary et al. ............. 715/843 |

(Continued)

FOREIGN PATENT DOCUMENTS

EP    0862304 A2    9/1998

(Continued)

OTHER PUBLICATIONS

Ed Bott and Ron Person, Using Windows 95 with Internet Explorer 4.0, Feb. 17, 1998, Que, Special Edition.*

(Continued)

*Primary Examiner*—Ryan F Pitaro
(74) *Attorney, Agent, or Firm*—Finnegan, Henderson, Farabow, Garrett & Dunner, L.L.P.

(57) ABSTRACT

Personalizing communications typically includes accessing status information for instant messaging sessions involving an instant messaging identity and passively configuring a buddy group associated with the instant messaging identity to persistently reflect a list of participant identities from instant messaging sessions in which the instant messaging identity recently participated. The buddy group may be configured without action from the instant messaging identity. The list of participant identities may be maintained persistently beyond logout of the instant messaging identity. The list of participant identities may be maintained independent of a device used for the instant messaging sessions during which the list was created such that the buddy group is accessible from one or more different devices.

98 Claims, 11 Drawing Sheets

U.S. PATENT DOCUMENTS

| | | |
|---|---|---|
| 5,870,744 A | 2/1999 | Sprague |
| 5,872,521 A | 2/1999 | Lopatukin et al. |
| 5,878,219 A | 3/1999 | Vance, Jr. et al. |
| 5,893,091 A | 4/1999 | Hunt et al. |
| 5,893,099 A | 4/1999 | Schreiber et al. |
| 5,920,692 A | 7/1999 | Nguyen et al. |
| 5,940,488 A * | 8/1999 | DeGrazia et al. ......... 379/93.23 |
| 5,946,617 A | 8/1999 | Portaro et al. |
| 5,948,058 A | 9/1999 | Kudoh et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,173 A | 9/1999 | Tang et al. |
| 5,987,113 A | 11/1999 | James |
| 5,991,791 A | 11/1999 | Siefert |
| 5,995,023 A | 11/1999 | Kreft |
| 6,002,402 A | 12/1999 | Schacher |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,049,533 A | 4/2000 | Norman et al. |
| 6,065,047 A | 5/2000 | Carpenter et al. |
| 6,073,138 A | 6/2000 | De l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,134,432 A | 10/2000 | Holmes et al. |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,199,103 B1 | 3/2001 | Sakaguchi et al. |
| 6,212,550 B1 | 4/2001 | Segur |
| 6,249,740 B1 | 6/2001 | Ito et al. |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,311,211 B1 | 10/2001 | Shaw et al. |
| 6,314,450 B1 | 11/2001 | Hachiya et al. |
| 6,324,541 B1 | 11/2001 | De l'Etraz et al. |
| 6,330,590 B1 | 12/2001 | Cotten |
| 6,347,332 B1 | 2/2002 | Malet et al. |
| 6,351,698 B1 | 2/2002 | Kubota et al. |
| 6,363,392 B1 | 3/2002 | Halstead et al. |
| 6,374,246 B1 | 4/2002 | Matsuo |
| 6,374,290 B1 | 4/2002 | Scharber et al. |
| 6,389,127 B1 | 5/2002 | Vardi et al. |
| 6,389,372 B1 | 5/2002 | Glance et al. |
| 6,400,381 B1 | 6/2002 | Barrett et al. |
| 6,415,318 B1 | 7/2002 | Aggarwal et al. |
| 6,421,439 B1 | 7/2002 | Liffick |
| 6,421,709 B1 | 7/2002 | McCormick et al. |
| 6,425,012 B1 | 7/2002 | Trovato et al. |
| 6,430,604 B1 | 8/2002 | Ogle et al. |
| 6,446,112 B1 | 9/2002 | Bunney et al. |
| 6,449,344 B1 | 9/2002 | Goldfinger et al. |
| 6,449,634 B1 | 9/2002 | Capiel |
| 6,480,885 B1 | 11/2002 | Olivier |
| 6,484,196 B1 | 11/2002 | Maurille |
| 6,501,834 B1 | 12/2002 | Milewski et al. |
| 6,507,866 B1 | 1/2003 | Barchi |
| 6,525,747 B1 | 2/2003 | Bezos |
| 6,535,586 B1 | 3/2003 | Cloutier et al. |
| 6,539,421 B1 | 3/2003 | Appelman et al. |
| 6,549,937 B1 * | 4/2003 | Auerbach et al. ........... 709/206 |
| 6,557,027 B1 | 4/2003 | Cragun |
| 6,559,863 B1 | 5/2003 | Megiddo |
| 6,571,234 B1 | 5/2003 | Knight et al. |
| 6,580,790 B1 | 6/2003 | Henry et al. |
| 6,615,241 B1 | 9/2003 | Miller et al. |
| 6,636,733 B1 | 10/2003 | Helferich |
| 6,640,230 B1 | 10/2003 | Alexander et al. |
| 6,654,683 B2 | 11/2003 | Jin et al. |
| 6,677,968 B1 | 1/2004 | Appelman |
| 6,678,719 B1 | 1/2004 | Stimmel |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,731,308 B1 | 5/2004 | Tang et al. |
| 6,732,155 B2 | 5/2004 | Meek |
| 6,750,881 B1 * | 6/2004 | Appelman ................... 715/733 |
| 6,772,188 B1 | 8/2004 | Cloutier |
| 6,781,608 B1 | 8/2004 | Crawford |
| 6,785,554 B1 | 8/2004 | Amerga |
| 6,785,681 B2 * | 8/2004 | Keskar et al. ................. 707/10 |
| 6,788,769 B1 | 9/2004 | Waites |
| 6,799,039 B2 | 9/2004 | Wu et al. |
| 6,800,031 B2 | 10/2004 | Di Cesare |
| 6,839,737 B1 | 1/2005 | Friskel |
| 6,901,559 B1 * | 5/2005 | Blum et al. ................. 715/811 |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |
| 6,917,965 B2 | 7/2005 | Gupta et al. |
| 6,941,345 B1 | 9/2005 | Kapil et al. |
| 6,993,564 B2 | 1/2006 | Whitten, II |
| 7,035,865 B2 | 4/2006 | Doss et al. |
| 7,058,036 B1 | 6/2006 | Yu et al. |
| 7,058,690 B2 | 6/2006 | Maehiro |
| 7,082,047 B2 | 7/2006 | Chow |
| 7,124,123 B1 | 10/2006 | Roskind et al. |
| 7,127,232 B2 | 10/2006 | O'Neil et al. |
| 7,177,880 B2 | 2/2007 | Ruvolo |
| 7,185,059 B2 | 2/2007 | Daniell et al. |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,222,156 B2 | 5/2007 | Gupta et al. |
| 7,275,215 B2 | 9/2007 | Werndorfer et al. |
| 7,313,760 B2 | 12/2007 | Grossman et al. |
| 7,436,780 B2 | 10/2008 | Stephens et al. |
| 2001/0005861 A1 | 6/2001 | Mousseau et al. |
| 2001/0013050 A1 | 8/2001 | Shah |
| 2002/0015061 A1 | 2/2002 | Maguire |
| 2002/0021307 A1 | 2/2002 | Glenn et al. |
| 2002/0023132 A1 | 2/2002 | Roskowski et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0065856 A1 | 5/2002 | Kisiel |
| 2002/0065894 A1 | 5/2002 | Dalal et al. |
| 2002/0077080 A1 | 6/2002 | Greene |
| 2002/0083136 A1 | 6/2002 | Whitten, II |
| 2002/0091667 A1 | 7/2002 | Jaipuria et al. |
| 2002/0103801 A1 | 8/2002 | Lysons |
| 2002/0112181 A1 | 8/2002 | Smith |
| 2002/0116463 A1 | 8/2002 | Hart |
| 2002/0116641 A1 | 8/2002 | Mastrianni |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175953 A1 * | 11/2002 | Lin ........................... 345/811 |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |

| | | |
|---|---|---|
| 2003/0004872 A1 | 1/2003 | Gardi et al. |
| 2003/0009523 A1 | 1/2003 | Lindskog et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick et al. |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0084103 A1 | 5/2003 | Weiner et al. |
| 2003/0093580 A1 | 5/2003 | Thomas et al. |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0167324 A1 | 9/2003 | Farnham et al. |
| 2003/0182394 A1 | 9/2003 | Ryngler et al. |
| 2003/0187813 A1 | 10/2003 | Goldman et al. |
| 2004/0015548 A1 | 1/2004 | Lee |
| 2004/0056901 A1 | 3/2004 | March et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0210844 A1 | 10/2004 | Pettinati et al. |
| 2004/0215648 A1 | 10/2004 | Marshall |
| 2004/0215721 A1 | 10/2004 | Szeto et al. |
| 2004/0260762 A1 | 12/2004 | Fish |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0060377 A1 | 3/2005 | Lo et al. |
| 2005/0076241 A1 | 4/2005 | Appelman |
| 2005/0080863 A1 | 4/2005 | Daniell |
| 2005/0086211 A1 | 4/2005 | Mayer |
| 2005/0102202 A1 | 5/2005 | Linden et al. |
| 2005/0114229 A1 | 5/2005 | Ackley et al. |
| 2005/0153681 A1 | 7/2005 | Hanson |
| 2005/0197846 A1 | 9/2005 | Pezaris |
| 2006/0075044 A1 | 4/2006 | Fox et al. |
| 2006/0168054 A1 | 7/2006 | Burkhart et al. |
| 2006/0173824 A1 | 8/2006 | Bensky et al. |
| 2006/0182248 A1 | 8/2006 | Smith et al. |
| 2006/0212561 A1 | 9/2006 | Feng |
| 2006/0277187 A1 | 12/2006 | Roese et al. |

FOREIGN PATENT DOCUMENTS

| | | |
|---|---|---|
| EP | 1176840 A1 | 1/2002 |
| GB | 2357932 A | 7/2001 |
| GB | 2368747 | 5/2002 |
| JP | 2000-499001 | 2/2000 |
| JP | A 2000-259514 | 9/2000 |
| JP | A 2000-284999 | 10/2000 |
| JP | A 2001-084320 | 3/2001 |
| WO | WO 97/10558 | 3/1997 |
| WO | WO 97/46955 | 12/1997 |
| WO | WO 98/16045 | 4/1998 |
| WO | 9847270 | 10/1998 |
| WO | WO 99/08434 | 2/1999 |
| WO | 9934628 | 7/1999 |
| WO | 9948011 | 9/1999 |
| WO | 0079396 | 12/2000 |
| WO | 01/06748 A | 1/2001 |
| WO | WO 01/22258 | 3/2001 |
| WO | 0124036 | 4/2001 |
| WO | 0143357 | 6/2001 |
| WO | 0167787 | 9/2001 |
| WO | 0180079 | 10/2001 |
| WO | 02/03216 A | 1/2002 |
| WO | 0235781 | 5/2002 |
| WO | 02062039 | 8/2002 |
| WO | 02/073886 | 9/2002 |
| WO | 2004028178 | 4/2004 |
| WO | 2005086723 | 9/2005 |

OTHER PUBLICATIONS

America Online Inc., "New AIM 4.7", Sep. 27, 2001, Internet: http://aim.aol.com.*

Americal Online Inc., "AOL Instant Messenger", Aug. 29, 2000, Internet: www.aol.com/aim/.*

CNET Networks Inc., "PopUp Killer", Sep. 13, 2001, Internet: download.cnet.com/downloads/0-10059-100-6932612.html.*

WebmasterWorld.com Inc., "HTML and Browsers", Mar. 5, 2001, Internet: www.webmasterworld.com/forum21/367.htm.*

"The LP Wireless Messenger", Messenger Documentation, http://www.lpwireless.com/messengerhelp.htm, pp. 1-7 (Nov. 22, 2002).

"What new about exchanging information over the Internet," Outlook 2000 SR-1 (9.0.0.4527) Help File, on or before Aug. 10, 2001, p. 1.

"About Internet directory services," Outlook 2000 SR-1 (9.0.0.4527) Help File, or or before Aug. 10, 2001, p. 1.

"Set up LDAP directory services," Outlook 2000 SR-1 (i.0.0.4527) Help File, on or before Aug. 10, 2001, p. 1.

"Look up contact information from an item," Outlook 2000 SR-1 (9.0.0.4527) Help File, on or before Aug. 10, 2001, p. 1.

J.C. Cannon, "Design Guide for Directory-Enabled Applications," [online], Apr. 2001 [retrieved on May 13, 2003]. Retrieved from the Internet http://msdn.microsoft.com/library/enus/dnactdir/html/BuildingADApps.asp?frame=true, pp. 1-9.

Microsoft Corporation, "Using ADSI, LDAP, and Network Management Functions With Active Directory," [online], Feb. 2002 [retrieved on May 13, 2003]. Retrieved from the Internet http://msdn.microsoft.com/library/enus/dnactdir/html/BuildingADApps.asp?frame=true, pp. 1-9.

Microsoft Corporation, "Comparing Microsoft Active Directory to Novell's NDS," [online], Sep. 1998 [retrieved on May 13, 2003]. Retrieved from the Internet http://msdn.microsoft.-com/library/enus/dnactdir/html/msdn_activedirvsnds.asp?frame=true, pp. 1-17.

Microsoft Corporation, "Active Directory Services Interface in the Microsoft Exchange 5.5 Environment," [online], Nov. 1997 [retrieved on May 13, 2003]. Retrieved from the Internet http://msdn.microsoft.com/library/enus/dnactdir/html/msdn_adsiexch.asp?frame=true, pp. 1-12.

"Active Directory Service Overview," [online], Nov. 30, 2001 [retrieved on May 13, 2003]. Retrieved from the Internet http://www.microsoft.com/windows2000/server/evaluation/business/-ad-datasheet.asp, pp. 105.

"Integrating Microsoft Metadirectory Services and Active Directory," [online], Aug. 31, 2000 [retrieved on May 13, 2003]. Retrieved from the Internet http://www.microsoft.com/windows2000/-server/evaluation/business/adwin2k.asp, p. 1.

"Benefits of Active Directory in a Windows 2000 Environment," [online], Sep. 20, 2001 [retrieved on May 13, 2003]. Retrieved from the Internet http://www.microsoft.com/windows2000/-server/evaluation/business/adwin2k.asp, pp. 1-9.

"Active Directory," [online], retrieved on May 13, 2003]. Retrieved from the Internet http://www.microsoft.com/windows2000/technologies/directory/AD/default.asp, pp. 1-13.

Microsoft Corporation, "Introduction to Active Directory Application Mode," Microsoft Windows Server 2003, Aug. 2002, pp. 1-13.

"Active Directory Features," [online], Jun. 15, 1999 [retrieved on May 13, 2003]. Retrieved from the Internet http://www.microsoft.com/windows2000/server/evaluation/features/adlist.asp, pp. 1-4.

"Windows 2000 Directory Services," [online], [retrieved on May 13, 2003]. Retrieved from the Internet http://www.microsoft.com/windows2000/technologies/directory/default.asp, pp. 1-2.

"Directory Integration Can Lower Total Cost of Ownership and Increase Application Functionality," [online], Jul. 27, 1998 [retrieved on May 13, 2003]. Retrieved from the Internet http://www.microsoft.com/presspass/press/1998/Jul98/ActivDPR.asp, pp. 1 of 4.

William R. Stanek, Microsoft Windows 2000 Administrator's Pocket Consultant [online]. Microsoft Corporation, 1999 [retrieved on May 8, 2003]. Retrieved from the Internet <http://www.microsoft-com/technet/prodtechnol/ad/windows2000/evaluate/05w2kada.asp?fr...>, pp. 1-6.

"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra...>, pp. 1-16.

William R. Stanek, Microsoft Windows 2000 Administrator's Pocket Consultant [online]. Microsoft Corporation, 1999 [retrieved on May 8, 2003}. Retrieved from the Internet <http://www.microsoft.com/technet/prodtechnol/ad/windows2000/evaluate/05w2kadb.asp?fra...>, pp. 1-10.

"Integrating Applications with Windows 2000 and Active Directory," [online], Oct. 2000 [retrieved on May 8, 2003]. Retrieved from the Internet <http://www.microsoft.com/technet/-prodtechnol/ad/windows2000/evaluate/adappstr.asp?fra...>, pp. 1-12.

"Part I: Active Directory Operations," Active Directory Operations Guide, Microsoft Corporation, Microsoft Windows 2000, Version 1.5, pp. 1-187.

"Part II: Tasks and Procedures Appendices," Active Directory Operations Guide, Microsoft Corporation, Microsoft Windows 2000, Version 1.5, pp. 1-131.

International Search Report for International Application No. PCT/US03/15715, mailed Aug. 14, 2003.

Eschenburg, Wo laufen sie denn?, Oct. 26, 1998, pp. 92-95.

Kohda et al., IMPP: A New Instant Messaging Standard and Its Impact on Internet Business, Dec. 2000, Fujitsu Sci. Tech. J., 36, 2, pp. 147-153.

"AOL technology: turning complicated things into engaging services", 1996 Annual Report, 22 pages.

"YAHOO! Messenger Makes the World a Little Smaller, More Informed", pp. 1-2, Jun. 21, 1999.

Alan Cohen, "Instant Messaging", Apr. 13, 1999, PC Magazine, PC Labs, 2 pages.

"AOL Instant Messenger Windows Beta Features", Jun. 24, 1999, 2 pages, AOL Instant Messenger All New Version 2.0, 2 pages, Jun. 24, 1999, What is AOL Instant Messanger, 3 pages, Jun. 24, 1999, Quick Tips for Getting Started, 5 pages, Jun. 24, 1999, Frequently Asked Questions About AOL Instant Messenger, 6 pages, Jun. 24, 1999.

International Search Report mailed Aug. 30, 2005 for International Application No. EP03731244.

Office Action, U.S. Appl. No. 10/184,002, filed Jan. 8, 2008, 19 pages.

International Search Report, Application Serial No. PCT/US05/45663, dated Apr. 11, 2008, 10 pages.

"A Countermeasure to Duplicate-detecting Anti-spam Techniques," Robert J. Hall, AT&T Labs Technical Report 99.9.1, 1999, Abst. and pp. 1-26.

"A Reputation System for Peer-to-Peer Networks," Gupta et al., Jun. 1-3, 2003, NOSSDAV'03, Monterey, California, pp. 144-152.

"Announce: Implementation of E-mail Spam Proposal," Maurice L. Marvin, news.admin.net-abuse.misc, Aug. 3, 1996, 2 pages.

"BestCalls.com Announces the BestCalls Technology Index," Business Wire, Jun. 30, 1999, Business Wire, p. 1.

"Better Bayasian Filtering," Paul Graham, Jan. 2003, pp. 1-11, http://www.paulgraham.com/better.html.

"Business at Cyberspeed; Brainstorm Becomes Quick Internet Hit," Walker, Jan. 24, 1999, The Washington Post, p. A.01 (4 total pages).

"CrushParty.com: Help," retrieved Jun. 23, 2002 from the World Wide Web: http://www.crushparty.com/help.jsp, 3 pages.

"Degrees of Separation Email Spam Protection," Halfbakery: Degrees of Separation Email Spam Protection, reprinted from http://halfbakery.com/idea/Degrees_20of_20Separation_20Email_20Spam_20Protecti ... printed on Mar. 1, 2004 (3 pages).

"Digital Artifacts for Remembering and Storytelling: Post History and Social Network Fragments," Viegas et al., retrieved from the World Wide Web: http://we.media.mit.edu/~fviegas/papers/posthistory_snf.pdf, 10 total pages (Jan. 2004).

"Finding Others Online: Reputation Systems for Social Online Spaces," Jensen et al., Apr. 20-25, 2002, CHI, Minneapolis, Minnesota, vol. 4, Issue 1, pp. 447-454.

"Hottie or Nottie? Web Site Voters Let You Know Whether You Sizzle or Fizzle," Marino, Jul. 11, 2001, Florida Times Union, p. C.1. (2 total pages).

"Icq.anywhere, Email Features—Email Center—ICQ.com," retrieved Apr. 29, 2004 from the World Wide Web: http://www.icq.com/email/popular-features.html, pp. 1-5.

"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=107029 ..., printed on Nov. 5, 2004 (3 pages).

"Instant Messaging for Gamers," PC Gamer, May 2004, vol. 11, No. 5, p. 28.

"GLWebMail 2.0 is released!" http://www.gordano.com; available on Apr. 18, 2001, reprinted from http://web.archive.org/web/20010418153714//http://www.gordano.com.

"Learning Spam: Simple Techniques for Freely-Available Software," Bart Massey et al, Computer Science Dept., Portland, OR USA, 2003, pp. 1-14.

"Learning to Filter Spam E-Mail: A Comparison of a Naïve Bayesian and a Memory-Based Approach," Ion Adroutsopoulos et al., University of Athens, Sep. 2000, pp. 1-12.

"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.

Mary Beth Marklein, "Student have 'away' with words", Mar. 28, 2004, USA Today, http://www.usatoday.com/tech/news/2004-03-28-aways-messages-usat_ x.htm, all pages.

"PieSpy—Inferring and Visualizing Social Network on IRC," PieSpy Social Network Bot, reprinted from http://lister.linux-srv.anlx.net/piespy printed on Mar. 11, 2004 (18 pages).

"plaxo," Plaxo, reprinted from http://web.archive.org/web/20041105072256/http://www.plaxo.com/ printed on Nov. 5, 2004 (available on Feb. 14, 2004) (2 pages).

"Plaxo-Update Your Address Book," Plaxo Contact Networks, reprinted from http://web.archive.org/web/20030218233638/http://www.plaxo.com/ printed on Nov. 5, 2004 (available on Feb. 18, 2003) (1 page).

"Reflections on Friendster, Trust and Intimacy," Danah Boyd. *Ubicomp* 2003, Workshop Application for the Intimate Ubiquitous Computing Workshop. Seattle, WA, Oct. 12-15, 2003.

"Reputation Systems," Resnick et al., Dec. 2000, Communications of the ACM, vol. 43, No. 12, pp. 45-48.

"RIM Road: Software: Internet & Network: Webmessenger RIM J2ME/Instant Messaging," retrieved Apr. 29, 2004 from the World Wide Web: http://www.rimrod.com/software/rim1/Webmessenger-RIM-J2ME-Instant-Messaging-20..., pp. 1-4.

"Six Degrees—New Programs Help Companies 'Mine Workers' Relationships for Key Business Prospects," William M. Bulkeley et al., Marketplace, The Wall Street Journal, Aug. 4, 2003, (3 pages).

"Social Nets Find Friends in VCs," Joanna Glasner, http://www.wired.com/news, Nov. 17, 2003, pp. 1-3.

"Social Network Fragments: An Interactive Tool for Exploring Digital Social Connections." Danah Boyd, Jeff Potter. Sketch at *SIGGRAPH 2003*. San Diego, California: ACM, Jul. 27-31, 2003.

"Social Networking for Business: Release 0.5," Esther Dyson, Esther Dyson's Monthly Report, vol. 21, No. 10, Nov. 25, 2003, www.edventure.com, (36 pages).

"Social Networks: Deodorant for the Soul?," Esther Dyson, Esther Dyson's Monthly Report, vol. 21, No. 11, Dec. 12, 2003, www.edventure.com, (36 pages).

"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004.

"Socialware: Multiagent Systems for Supporting Network Communities," Hattori et al., Mar. 1999, Association for Computing Machinery, Communications of the ACM, vol. 42, Issue 3, pp. 55ff.

"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).

"Support Vector Machines for Spam Categorization," Harris Drucker et al., IEEE Transactions on Neural Networks, vol. 10, No. 5, Sep. 1999, pp. 1048-1054.

"Support Vector Machines," Marti Hearst, IEEE Intelligent Systems, Jul./Aug. 1998, pp. 18-28.

"SVM-based Filtering of E-mail Spam with Content-specific Misclassification Costs," Aleksander Kolcz et al., *TextDM'2001* (*IEEE ICDM-2001 Workshop on Text Mining*), San Jose, CA, 2001, pp. 1-14.

"SWF Seeks Attractive Head Shot; To Stand Out, Online Daters Pay for Professional Photos; Cropping out the Ex-Wife," Leiber, Nov. 19, 2003, The Wall Street Journal, p. D.1.

"Technical Solutions for Controlling Spam," Shane Hird, Proceedings of AUUG2002, Melbourne, Sep. 4-6, 2002, 17 pages.

"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).

"Telstra targets Net spammers," J. Dudley, news.com.au, Dec. 2, 2003, 2 pages.

"Text Categorization with Support Vector Machines: Learning with Many Relevant Features," Thorsten Joachims, University of Dortmund, Computer Science Dept., LS-8 Report 23, 1998, 18 pages.

"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).

"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.

"Using Active Directory Service", from Chapter 5, *Microsoft Windows 2000 Administrator's Pocket Consultant*, by William R. Stank (1999). Retrieved from http://www.microsoft.com/technet/prodtechnol/ad/windows2000/evaluate/05w2kadb.asp?fr..., pp. 1-6.

"Welcome to Huminity World of Connections," Huminity-Home, reprinted from http://web.archive.org/web/20030228131435/www.huminity.com/default.php?internationa... printed on Nov. 5, 2004 (available on Feb. 2, 2003) (1 page).

"Will You Buy a Car From This Man?," Leander Kahney, Oct. 6, 2003, pp. 1-3.

"Windows 2000 Directory Services", [online] http://www.mircrosoft.com/windows2000/technologies/directory/default.asp, as of Nov. 25, 2001 according to Internet Archive Wayback Machine, available at http://web.archive.org/web20011625224156/http://www.microsoft.com/windowns2000/technologies/directory/defalt.asp, 1 page.

"Working with Active Directory Domains", from Chapter 5, *Microsoft Windows 2000 Administrator's Pocket Consultant*, by William R. Stank (1999). Retrieved from http://www.microsoft.com/technet/prodtechnol/ad/windows2000/evaluate/05w2kadb.asp?fr..., pp. 1-10.

Anand Ranganathan et al., "ConChat: A Context-Aware Chat Program", 2002, Pervasive Computing, pp. 51-57.

BuddyGopher~About, available on Jul. 13, 2004, reprinted from http://web.archive.org/web/20040713002836/www.buddygopher.com/about.html on Sep. 28, 2005 (4 pgs).

BuddyGopher~We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 28, 2005 (2 pgs).

Notice of Allowance for U.S. Appl. No. 10/184,002 dated Jul. 24, 2008, 20 pages.

Supplementary European Search Report issued in European Application No. EP05728303, dated Jan. 9, 2009, (2 pages).

Dodgeball.com:: mobile social software, "help: the basics", available on Oct. 9, 2004, reprinted from http://web.archive.org/web/20041009200739/www.dodgeball.com/social/help_basics.php on Sep. 28, 2005 (2 pgs).

Dodgeball.com:: mobile social software, "help: text messaging", available on Oct. 13, 2004, reprinted from http://web.archive.org/web/20041013034241/www.dodgeball.com/social/help_text.php on Sep. 28, 2005 (3 pgs).

Dodgeball.com:: mobile social software, "help: use it", available on Oct. 9, 2004, reprinted from http://web.archive.org/web/20041009201853/www.dodgeball.com/social/help_useit.php on Sep. 28, 2005 (2 pgs).

Dodgeball.com:: mobile social software, "Hook up with friends. Discover what's around you.", available on Nov. 30, 2003, reprinted from http://web.archive.org/web/20041130034344/www.dodgeball.com/social/index.php on Sep. 28, 2005 (2 pgs).

Home-tribe.net http://washingtondc.tribe.net/message/24434d1b-817b-4580-aa42-3bffa15f26a?page=1 (4 total pages, reprinted on Dec. 13, 2004).

http://www.friendster.com (17 pages, reprinted on Dec. 13, 2004).

International Search Report, Application Serial No. PCT/US2006/018286, dated Oct. 19, 2006, 12 pages.

International Search Report and Written Opinion dated Feb. 15, 2006 for International Application No. PCT/US05/07204, 14 pages.

International Search Report dated Oct. 16, 2006, for PCT/US05/08476, 9 pages.

International Search Report and Written Opinion for PCT Application No. PCT/US2005/042992, Mar. 6, 2007 (14 pages).

Mckendrick, Joseph; "Internet Call Centers: New Era in Customer Service", Feb. 2002; V10, n2, pp22(4).

Neo Mai, Ken Neo. "Buying and selling on the internet; [Computimes, 2* Edition]." New Straits Times. Kuala Lumpur: Jun. 28, 2001. p. 53.

Office Action of U.S. Appl. No. 11/237,718, filed Apr. 2, 2009, 20 pages.

R. Movva & W. Lai, "MSN Messenger Service 1.0 Protocol", Aug. 1999, Internet Draft, http://tools.ietf.org/id/draft-movva-msn-messenger-protocol-oo.txt, 28 pages.

Reichard, K., "AOL, ICQ to Interoperate—But in a Limited Fashion," Oct. 30, 2002, InstantMessagingPlanet, available at www.instantmessagingplanet.com/public/article.php/1490771.

Ryze home page, www.ryze.com, Dec. 21, 2003, available at http://web.archive.org/web/20031221010006/http://ryze.com, printed Mar. 16, 2005, 13 pages.

Takashi Yoshino et al., "Namba: Location-Aware Collaboration System for Shopping and Meeting", Aug. 2002, IEEE Transactions on Consumer Electronics, pp. 470-477.

VisiblePath webpages, www.visiblepath.org, Dec. 3, 2003, available at http://web.archive.org/web/20031203132211/http://www.visiblepath.com, printed Mar. 16, 2005, 5 pages.

ZeroDegrees home page, www-zerodegrees.com, Jan. 24, 2004, available at http://web.archive.org/web/20040204153037/www.zerodegrees.com/home.htm, printed Mar. 16, 2005, 2 pages.

Office Action of Canadian Application No. 2,462,037, dated Feb. 12, 2009 (8 pages).

Courter et al., "Mastering Microsoft Outlook 2000 Premium Edition", Sybex Inc., Alameda, California, 2000 pp. 167-169, ISBN 0-7821-2676-6.

"The LP Wireless Messenger", Messenger Documentation, http://www.lpwireless.com/messengerhelp.htm, pp. 1-7, available on Dec. 9, 2002, reprinted from http://web.archive.org/web20021209025321/http://lpwireless.com/messengerhelp.htm.

Office Action of U.S. Appl. No. 10/184,002, dated Jan. 9, 2007, 16 pages.

Office Action of U.S. Appl. No. 11/015,424, dated Mar. 19, 2008, 43 pages.

Office Action of U.S. Appl. No. 10/184,002, dated Jan. 8, 2008, 19 pages.

Office Action of U.S. Appl. No. 11/238,130, dated Apr. 14, 2009, 35 pages.

Office Action of U.S. Appl. No. 11/238,130, dated Nov. 13, 2008, 45 pages.

Office Action of U.S. Appl. No. 11/238,130, dated Jul. 3, 2008, 22 pages.
Office Action, U.S. Appl. No. 09/843,788, dated Apr. 19, 2007, 17 pages.
Office Action, U.S. Appl. No. 10/146,814, dated Jul. 2, 2007, 18 pages.
Office Action, U.S. Appl. No. 10/184,002, dated Jan. 9, 2007, 16 pages.
Office Action, U.S. Appl. No. 10/146,814, dated Dec. 11, 2006, 15 pages.

* cited by examiner

PASSIVE PERSONALIZATION OF LISTS

CROSS REFERENCE TO RELATED APPLICATIONS

This application claims priority from U.S. Provisional Application No. 60/325,084, filed Sep. 28, 2001, and titled "Passive Personalization of Buddy List," which is incorporated by reference in its entirety.

TECHNICAL FIELD

The present invention relates generally to passively personalizing a user interface, in particular, an instant messaging user interface.

BACKGROUND

Online service providers offer new services and upgrade existing services to enhance their subscribers' online experience. Subscribers have on-demand access to news, weather, financial, sports, and entertainment services, and have the ability to transmit electronic messages and to participate in online discussion groups. For example, subscribers of online service providers such as America Online or CompuServe may view and retrieve proprietary or third party content on a wide variety of topics from servers located throughout the world.

One such service is instant messaging. Members of an instant messaging service can communicate virtually in real time with other instant messaging members. Members may manually create a list of screen names for other members, and may establish instant messaging sessions with those other members using the buddy list.

SUMMARY

In one general aspect, personalizing communications typically includes accessing status information for instant messaging sessions involving an instant messaging identity and passively configuring a buddy group associated with the instant messaging identity to persistently reflect a list of participant identities from instant messaging sessions in which the instant messaging identity recently participated.

Implementations may include one or more of the following features. For example, the buddy group may be configured without action from the instant messaging identity. The list of participant identities from instant messaging sessions in which the instant messaging identity recently participated may be maintained persistently beyond logout of the instant messaging identity. The participant identities may be maintained on the list after an instant messaging session with the instant messaging identity is terminated.

In one implementation, the participant identities may be maintained on the list independent of a device used for the instant messaging sessions during which the list was created such that the buddy group is accessible from one or more different devices.

In one implementation, a screen name of a participant identity may be added to the list of participant identities only when an instant messaging session with the participant identity is closed. Additionally or alternatively, a screen name of a participant identity may be added to the list of participant identities only when an instant messaging session with the participant identity is closed and the screen name of the participant identity is not already included in the buddy group.

In another implementation, a screen name of a participant identity may be added to the list of participant identities when an instant messaging session with the participant identity is established. Additionally or alternatively, a screen name of a participant identity may be added to the list of participant identities when an instant messaging session with the participant identity is established and the screen name of the participant identity is not already included in the buddy group.

The list of participant identities from instant messaging sessions in which the instant messaging identity recently participated may be limited to participant identities not otherwise included on any other list for the instant messaging identity. The buddy group may be configured to limit the list of participant identities to exclude participant identities from which an instant message is received but not accepted. Additionally or alternatively, a screen name of a participant identity may be added to the list of participant identities from which an instant message is received but not accepted.

The buddy group may be configured such that the list of participant identities from instant messaging sessions in which the instant messaging identity recently participated includes participant identities that are included on at least one other list for the instant messaging identity.

The buddy group may be configured such that a size of the buddy group is limited. A size of the buddy group may be established based on a selection by the instant messaging identity. A size of the buddy group may be initially established based on a default value. The list of participant identities may be sequenced using a least recently used methodology. Additionally or alternatively, the list of participant identities may be sequenced using a first-in first-out methodology.

Screen names of participant identities may be arranged on the list of participant identities such that a most recent screen name is listed first. Screen names of participant identities may be arranged on the list of participant identities such that a least recently used screen name is omitted whether or not the least recently used screen name was first-in on the list of participant identities.

The passively configured buddy group may be displayed. An online status may be displayed for each participant identity in the buddy group.

A log associated with the instant messaging identity may be updated where the log includes a chronological record of instant messaging activity. In one implementation, the buddy group may be based on the updated log. Updating the log may include recording a screen name of a participant identity from an instant messaging session. Updating the log also may include recording a time when an instant messaging session is established.

These general and specific aspects may be implemented using a system, a method, or a computer program, or any combination of systems, methods, and computer programs.

Other features and advantages will be apparent from the description and drawings, and from the claims.

DETAILED DESCRIPTION

For illustrative purposes, FIGS. 1-5 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Figure 1:
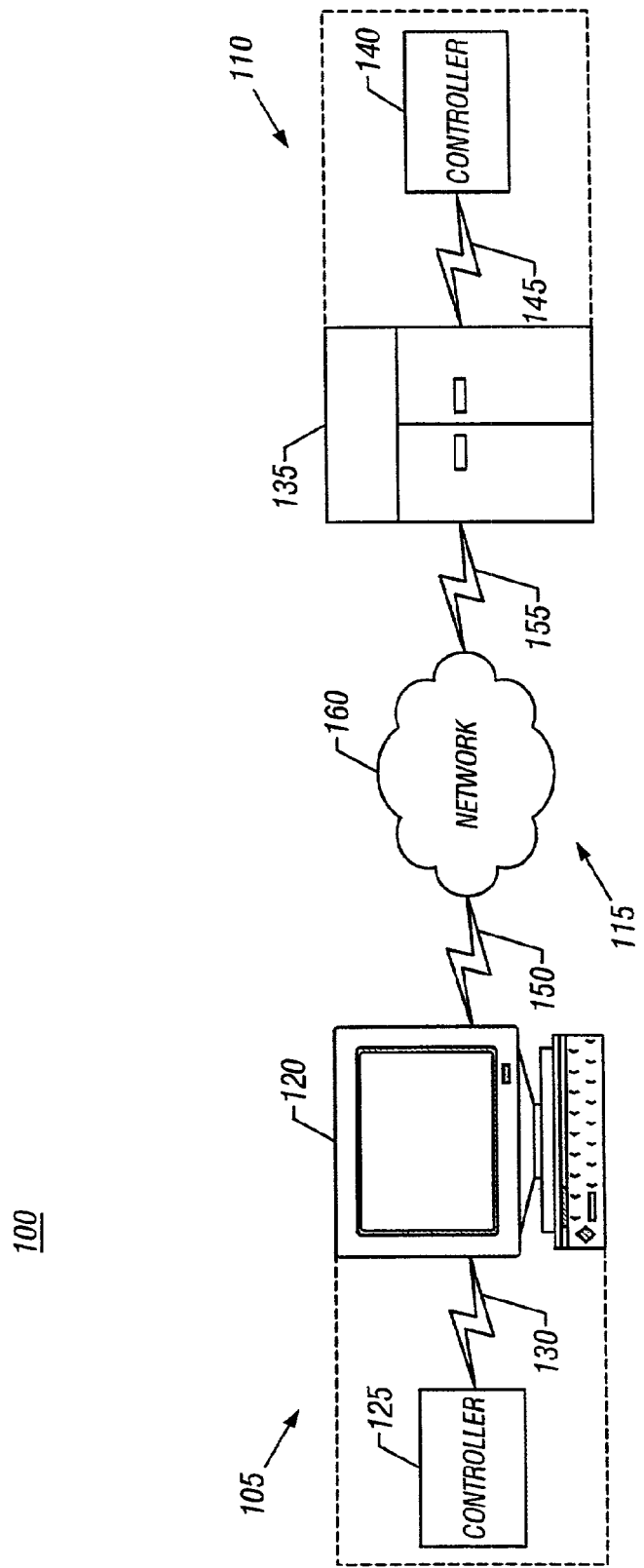
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The client device 120 and the host device 135 may include devices that are capable of peer-to-peer communications.

An example of a client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

Figure 2:
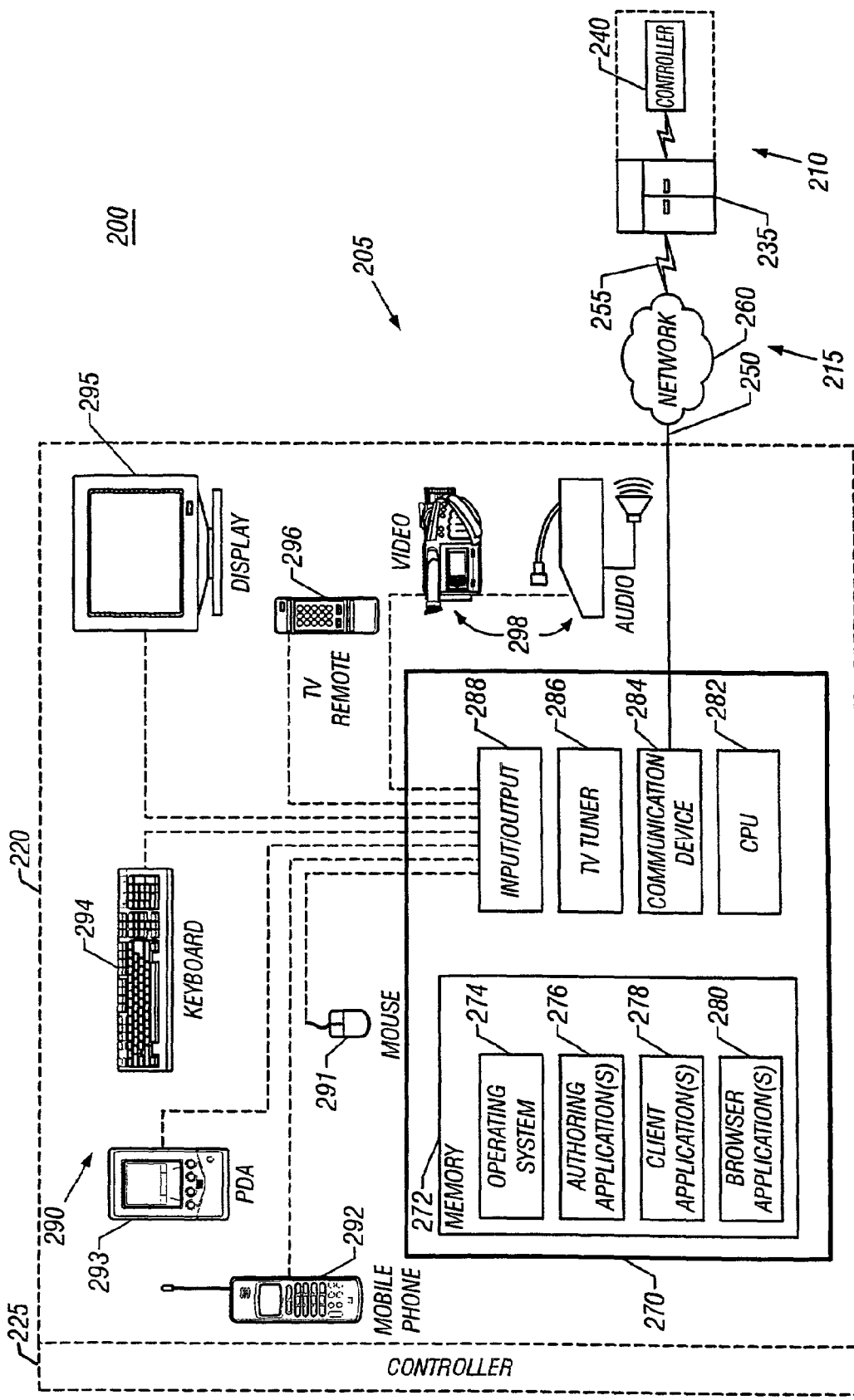
FIGS. 2-5 are expansions of the block diagram of FIG. 1.

FIG. 2 illustrates a communications system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250 and 255 that enable communications through the one or more delivery networks 260.

Examples of each element within the communications system of FIG. 2 are broadly described above with respect to FIG. 1. In particular, the host system 210 and communications link 215 typically have attributes comparable to those described with respect to the host system 110 and the communications link 115 of FIG. 1. Likewise, the client system 205 of FIG. 2 typically has attributes comparable to and illustrates one possible implementation of the client system 105 of FIG. 1.

The client device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), an MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, an MP3 player (not shown), and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
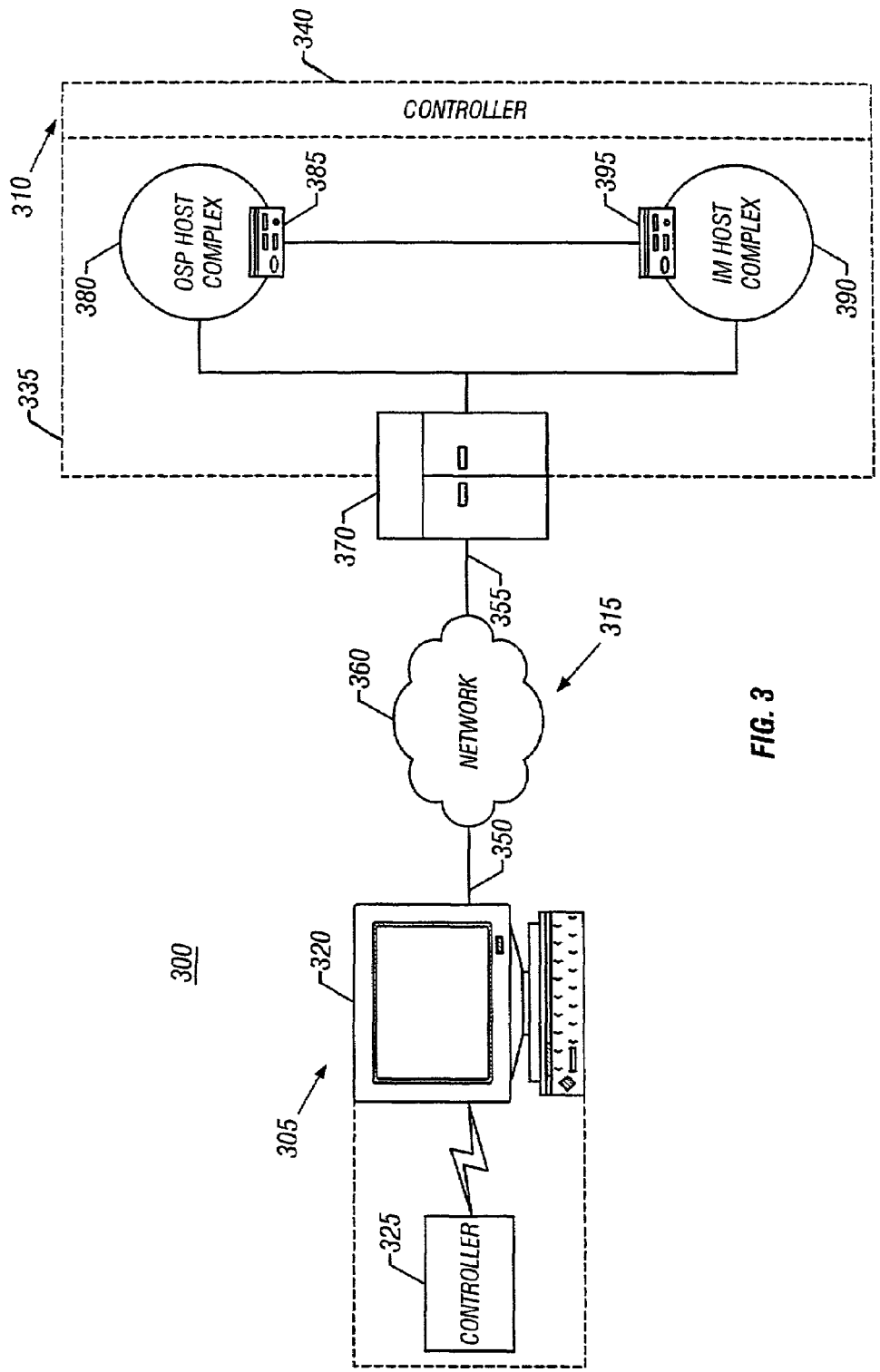

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350 and 355 that enable communications through the one or more delivery networks 360.

Examples of each element within the communications system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible implementation of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. In other implementations, as described above, the host controller 340 may include any of several other programs, machines, and devices operating independently or collectively to control the host device 335.

The host device 335 includes a login server 370 for enabling access by subscribers and for routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
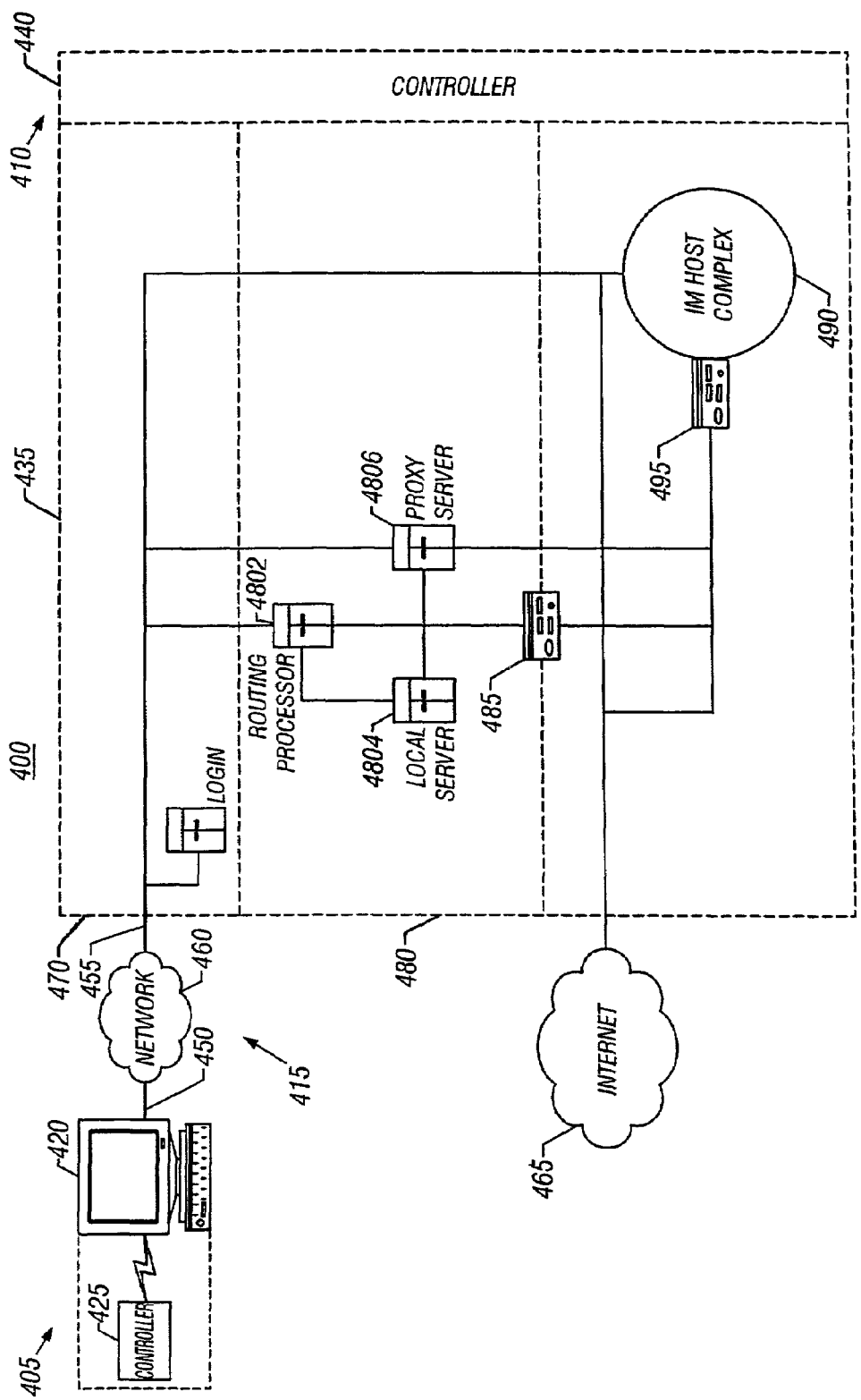

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450 and 455 that enable communications through the one or more delivery networks 460. As shown, the client system 405 may access the Internet 465 through the host system 410.

Examples of each element within the communications system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible implementation of the host systems 110, 210, and 310 shown in FIGS. 1-3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communications between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In one implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet 465 in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber may use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include an L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
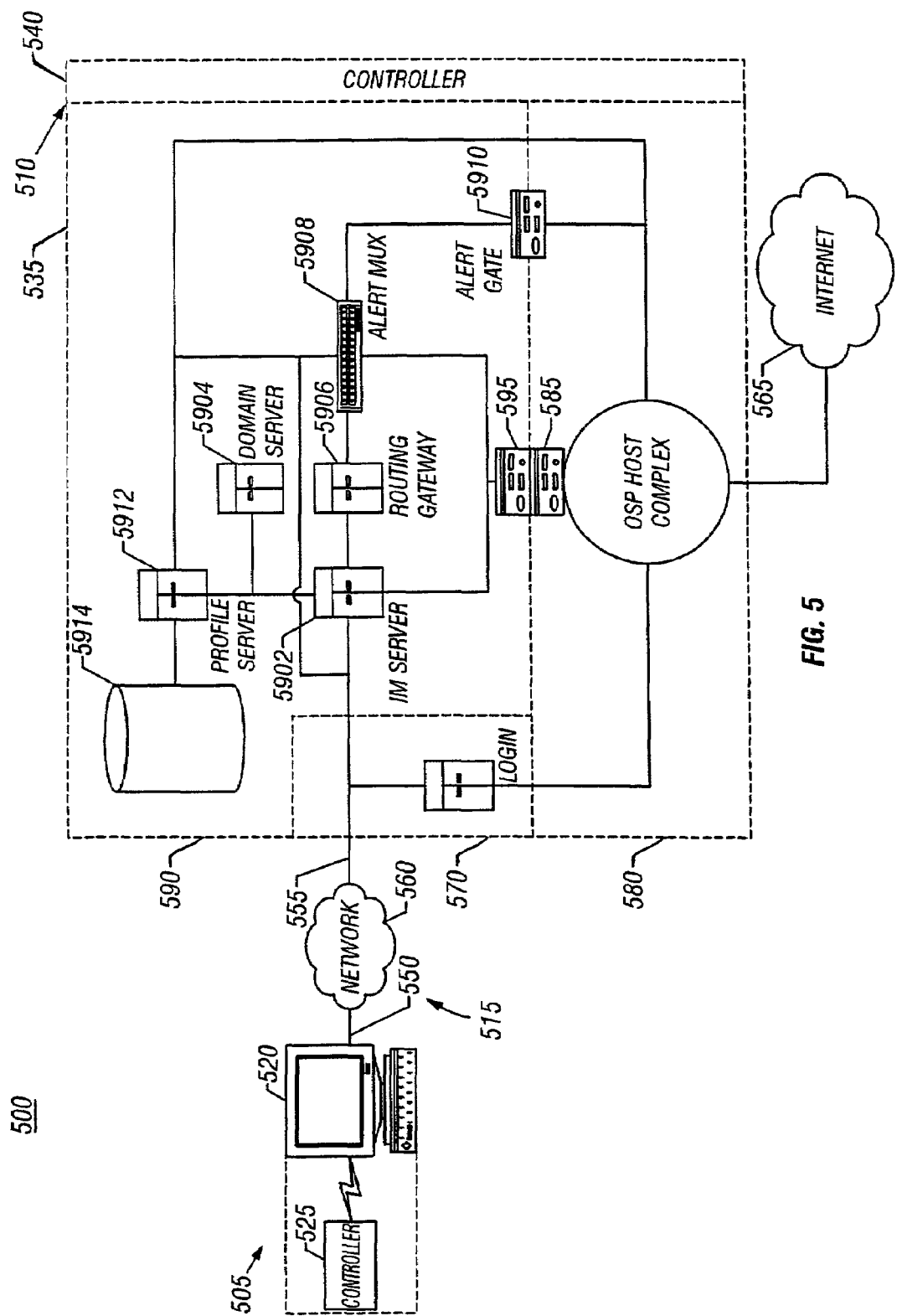

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communications system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible implementation of the host systems 110, 210, 310, and 410 shown in FIGS. 1-4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 using exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 and begin an IM session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the World Wide Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM host complex gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 580 to share subscriber profile data with other services. Alternatively, user profile data may be saved locally on the client device 505.

Figure 6:
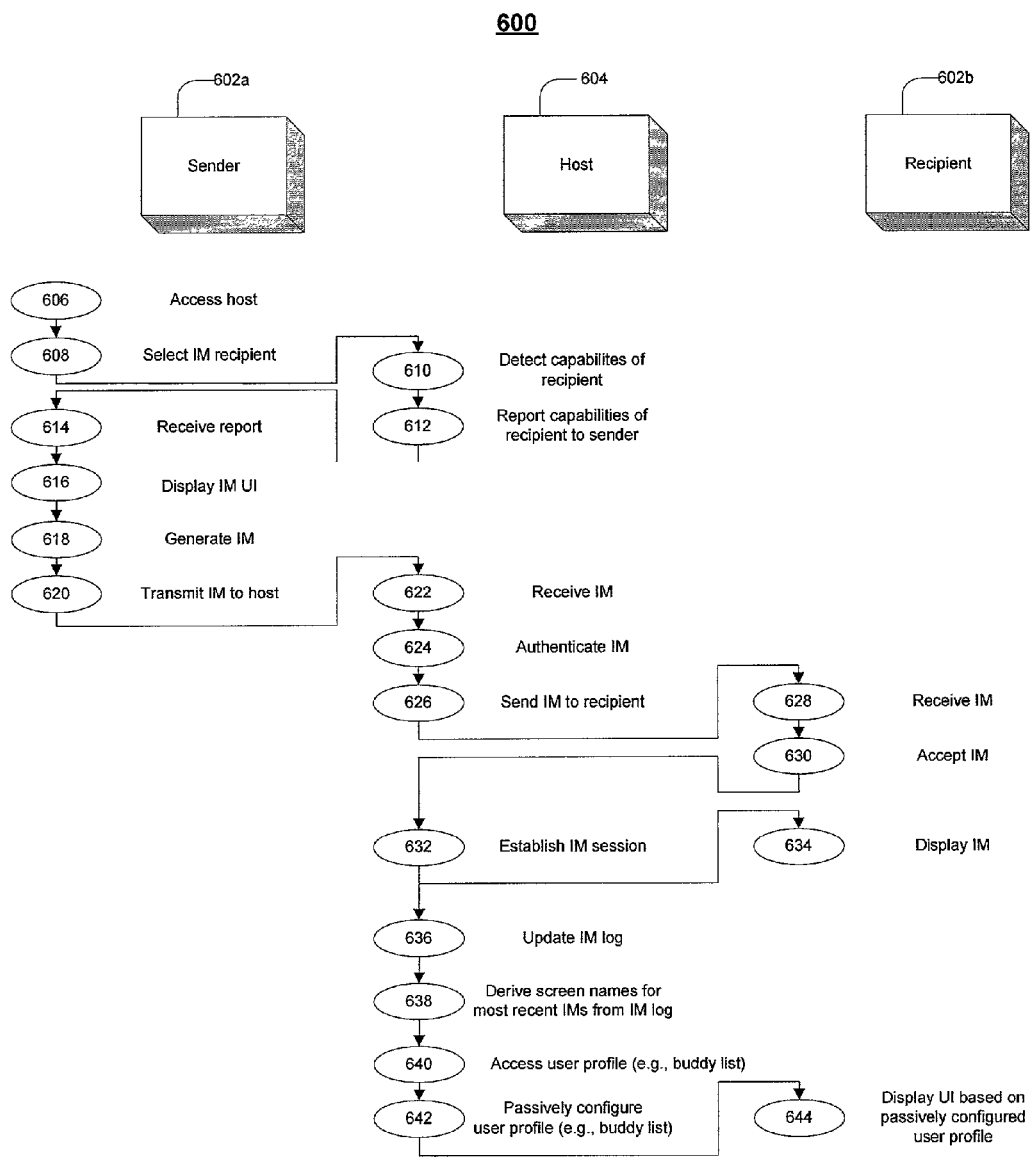
FIG. 6 is a flow chart of a communications method implemented by the communications system of FIGS. 1-5.

Referring to FIG. 6, a sender 602a, a recipient 602b, and a host 604 exchange communications according to a procedure 600. The procedure 600 may be implemented by any suitable type of hardware (e.g., device, computer, computer system, equipment, component); software (e.g., program, application, instructions, code); storage medium (e.g., disk, external memory, internal memory, propagated signal); or combination thereof.

Examples of each element of FIG. 6 are broadly described with respect to FIGS. 1-5 above. In particular, the sender 602a and the recipient 602b may have attributes comparable to those described with respect to client devices 120, 220, 320, 420, and 520 and/or client controllers 125, 225, 325, 425, and 525. The host 604 may have attributes comparable to those described with respect to host devices 135, 235, 335, 435, and 535 and/or host controllers 140, 240, 340, 440, and 540. The sender 602a, the recipient 602b, and/or the host 604 may be directly or indirectly interconnected through a known or described delivery network, such as delivery networks 160, 260, 360, 460, and 560.

In one implementation, the sender 602a is associated with a first subscriber, the recipient 602b is associated with a second subscriber, and each of the sender 602a and the recipient 602b includes an application for accessing the host 604. A subscriber's transfer preferences may be maintained locally at the application or remotely at the host 604. Each subscriber may use the application to set individual preferences for allowing messages and/or files to be transferred to and from other subscribers. Typically, a graphical user interface ("UI") is displayed to allow each subscriber to select among various levels of security and/or to grant (or deny) access to others subscribers. For example, transfer preferences may be set to allow all users or only certain users (e.g., user's included in the subscriber's buddy list) to contact the recipient 602b. If the transfer preferences of the recipient 602b have been set to block a subscriber attempting contact, the sender 602a may display a UI indicating that instant messaging with the recipient 602b is unavailable.

More specifically, the sender 602a is a subscriber and/or a client (e.g., client system 505), and the host 604 includes one or more host complexes (e.g., OSP host complex 580 and/or IM host complex 590) for providing instant messaging capability and coordinating the transfer of electronic data between subscribers. The sender 602a may access the host 604 using any available device and/or controller.

An example of a device is a general-purpose computer capable of responding to and executing instructions in a defined manner. Other examples include a special-purpose computer, a personal computer ("PC"), a workstation, a server, a laptop, a Web-enabled telephone, a Web-enabled personal digital assistant ("PDA"), an interactive television set, a settop box, a video tape recorder ("VTR"), a DVD player, an on-board (i.e., vehicle-mounted) computer, or any other component, machine, tool, equipment, or some combination thereof capable of responding to and executing instructions.

An example of a controller is a software application (e.g., operating system, browser application, microbrowser application, server application, proxy application, gateway application, tunneling application, e-mail application, IM client, online service provider client application, interactive television client application, and/or ISP client) loaded on a device to command and direct communications enabled by the device. Other examples include a computer program, a piece of code, an instruction, another device, or some combination thereof, for independently or collectively instructing the device to interact and operate as desired. The controller may be embodied permanently or temporarily in any type of machine, component, physical or virtual equipment, storage medium, or propagated signal capable of providing instructions to a device. In particular, the controller (e.g., software application, computer program) may be stored on a storage media or device (e.g., ROM, magnetic diskette, or propagated signal) readable by a general or special purpose programmable computer, such that if the storage media or device is read by a computer system, the functions described herein are performed.

In the following example, it is assumed that the transfer preferences are set to allow messages and files to be transferred between the sender 602a and the recipient 602b. To communicate using instant messaging, the sender 602a and the recipient 602b access the host 604 concurrently. In order to access the host 604, the sender 602a and the recipient 602b each separately request authentication or recognition by the host 604. The request identifies the associated subscriber to the host 604 for subsequent identification to other subscribers using a unique screen name. The sender 602a and the recipient 602b each may include a Winsock API for opening and establishing a TCP connection to the host 604.

The host 604 verifies a subscriber's information (e.g., screen name and password) against data stored in a subscriber database. If the subscriber's information is verified, the host 604 authorizes access and or acknowledges the subscriber. If the subscriber's information is not verified, the host 604 denies access and sends an error message.

After being authorized, a direct (i.e., socket) connection may be established through the host 604 to allow the sender 602a and the recipient 602b to communicate. The sender 602a and the recipient 602b use this connection to communicate with the host 604 and with each other. This connection remains available during the time that the sender 602a and the recipient 602b are accessing the host 604, or until either party decides to terminate.

Upon accessing the host 604, a "buddy list" is displayed to the subscriber. In general, a subscriber's buddy list is maintained with or accessible as part of a subscriber's user profile and may be made accessible using a user interface (UI) that provides the online status and capabilities of certain screen names, i.e., "buddies," identified by the subscriber. In particular, the host 604 informs the sender 602a whether identified buddies are online, i.e., currently accessing the host 604. The host 604 also informs any subscriber who has identified the sender 602a as a buddy that the sender 602a is currently online.

A buddy list may be used to facilitate IM communications between subscribers. For example, a subscriber can activate an IM user interface that is pre-addressed to a buddy simply by selecting the screen name of an online buddy from the buddy list.

Alternatively, by way of example, if a recipient is not a "buddy," the first subscriber generally initiates IM communications by activating a blank IM user interface and then addressing that interface to the screen name of the intended recipient. When necessary, a subscriber can look up the screen name of an intended recipient using the intended recipient's e-mail address.

In the implementation of FIG. 6, a sender 602a, a recipient 602b, and a host 604 interact according to a procedure 600 that extends the functionality of instant messaging by passively personalizing the buddy list of at least one of the sender 602a and the recipient 602b.

Initially, the sender 602a accesses the host 604 (step 606). The sender 602a designates at least one recipient 602b to receive an instant message (step 608). The instant message may be, for example, a text or non-text (e.g., audio, video) instant message created by the sender 602a.

More specifically, in one implementation of this process in which the sender 602a has previously designated a screen name associated with the intended recipient 602b as a "buddy," a UI (e.g., buddy list) indicating the online status and capabilities of the recipient 602b is displayed to the sender 602a. Thus, the sender 602a can confirm that the recipient 602b is able to communicate (i.e., is online) and then designate the recipient 602b for receipt of an instant message by selecting (e.g., clicking) the screen name associated with the recipient 602b to open an IM interface (step 608).

After an IM recipient is selected (step 608), the host 604 detects the capabilities of the recipient (step 610) and reports the capabilities of the recipient 602b to the sender 602a (step 612). In one implementation, a network of servers (e.g., IM servers 5902) on the host 604 monitors and updates the online status, client version, and device type of connected subscribers and reports or enables access to this information by other subscribers in real time or substantially in real time. Yet, the accuracy and timeliness of information reported using an instant messaging interface may depend on factors such as a subscriber's hardware (e.g., device type), software (e.g., client version), and/or transfer preferences (e.g., blocked screen names).

Next, the sender 602a receives the report from the host 604 (step 614) and displays a UI corresponding to the capabilities of the sender 602a and/or the recipient 602b (step 616). In general, if the sender 602a (e.g., client system 505) is not voice-enabled and/or video-enabled, the sender 602a displays a standard instant messaging UI. If the sender 602a is voice-enabled and/or video-enabled, then the sender 602a may be configured to display a voice-enabled and/or video-enabled UI.

The sender 602a then composes a message in the IM interface (step 618) and transmits the instant message to the host 604 (step 620). In general, the sender transmits the message by selecting a send button.

The host 604 receives the instant message from the sender 602a (step 622) and then optionally authenticates the instant message (step 624). In one implementation, the instant message includes header information identifying the message type, the screen name and/or IP address of the sender 602a and the recipient 602b, and a randomly generated security number. A server (e.g., IM server 5902) on the host 604 may authenticate the instant message by matching the screen names and/or IP addresses with those of valid subscribers stored in a reverse look-up table. In the event that either the sender 602a or the recipient 602b is not associated with a valid subscriber, the host 604 reports an error message. The host 604 then sends the instant message to the recipient 602b (step 626).

The recipient 602b receives the instant message from the host (step 628) and then accepts the instant message (step 630). Accepting the instant message may occur automatically if the subscriber that sent the instant message has been pre-authorized according to the transfer preferences of the recipient 602b.

For example, acceptance may occur automatically if the sender 602a is included on a buddy list maintained by the recipient 602b. Alternatively, accepting the instant message may include displaying a warning UI based on the transfer preferences of the recipient 602b. For example, the preferences of the recipient 602b may be set to present an "accept message" dialog before displaying messages from any users or certain users (e.g., users not included in the subscriber's buddy list).

After the instant message is accepted (step 630), the host establishes an IM session (step 632) that enables the sender 602a and the recipient 602b to communicate substantially in real time. Establishing an IM session generally involves connecting one or more communication channels for transferring data between the sender 602a and the recipient 602b. The communication channels may allow the sender 602a and the recipient 602b to transfer data directly with each other (e.g., over a peer-to-peer connection) or may require the data to pass through an intermediary (e.g., host 604).

An active IM session may use one or more communication channels, such as, for example, a generic signaling interface (GSI) channel, a control channel, and a data channel. The GSI channel may be used to establish the initial connection. During this connection, the local IP addresses are exchanged. After the initial connection phase is done, the GSI channel is no longer used. By using the GSI channel, the exchange of local IP addresses is done only when both subscribers authorize such an exchange. Thus, using the GSI channel protects subscribers from having their local IP addresses automatically obtained without their consent.

The control channel is typically a TCP/IP socket for which the IP address and port number of the remote side are obtained through the GSI channel. The control channel may be used to send/receive control attributes of an active session. For example, because some firewalls will not allow a connection to be initiated by an external device with a socket on the inside of the firewall, a connection is attempted from both sides of the session.

The data channel also is typically a TCP/IP socket, and is used to transport data packets using various protocols such as UDP and TCP. In general, UDP is used since it minimizes latency. However, because some firewalls will not allow UDP packets to pass through, the data channel may use a different protocol, such as TCP. The client may indicate a particular mode (i.e., TCP, UDP) or, alternatively, an auto mode where it attempts a UDP test, and upon failure resorts to a secondary protocol (e.g., TCP).

Figure 7:
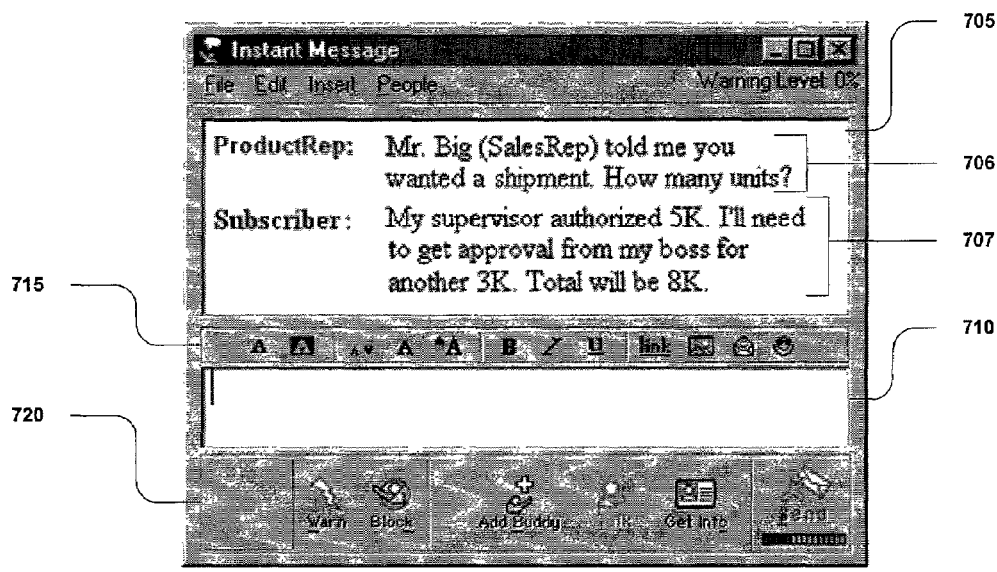
FIGS. 7-10 are user interfaces that may be displayed by the communications system of FIGS. 1-5.

When an IM session has been established successfully (step 632), the sender 602a and the recipient 602b may exchange communications substantially in real time. In one implementation, the recipient 602b displays an instant message received from the sender 602a (step 634). Referring to FIG. 7, for example, a UI 700 that may be displayed by the sender 602a and/or the recipient 602b includes an IM window 705 for displaying a running transcript of an IM session and a text message area 710 for entering the text of an instant message. In this example, the IM session includes a first instant message 705 from a first subscriber having a first screen name (ProductRep) and second instant message 707 from a second subscriber having a second screen name (Subscriber). Although the first and second subscribers of this example have each sent and received instant messages, the following description is provided with reference to the first subscriber as being associated with the sender 602a and the second subscriber as being associated with the recipient 602b.

The UI 700 also includes an IM toolbar 715 for changing text or background colors, changing text size, emphasizing text (e.g., bold, italic, or underlining), and inserting objects (e.g., emoticons, hyperlinks, images). In addition, the UI 700 includes IM buttons 720 for performing IM functions such as notifying the OSP of offending conduct, blocking a subscriber, adding an IM contact (e.g., buddy), initiating an audio (or video) IM session, getting the profile of a sender, and sending instant messages.

When an IM session is closed, the sender 602a and the recipient 602b may not exchange communications until a new IM session is established between the sender 602a and the recipient 602b. An IM session may be closed when the participants close the IM window 705, when either the sender 602a or the recipient 602b disconnects from the host 604, or when a configurable period of time has passed during which no communications are exchanged between the sender 602a and the recipient 602b.

During an active IM session, the host 604 may moderate the IM session. In one implementation, a server (e.g., IM server 5902, domain server 5904) on the host 604 is configured to moderate an IM session between at least one sender 602a and at least one recipient 602b. Moderating an IM session may include managing load conditions of the host 604 by compressing, decompressing, caching, and/or allocating resources to efficiently store and forward instant messages.

Moderating the IM session also may include updating an IM log (step 636). In general, an IM log includes a chronological record of IM activity (e.g., the existence or status of separate and/or successful IM sessions, the opening or closing of an IM session, the communication of instant messages during each separate and/or successful IM session, the request or receipt of alerts, or the connection or disconnection with the host). The IM log may be stored and maintained on the host 604 (e.g., by database 5914 of IM host 590), the sender 602a (e.g., by memory 272 of the client device,), and/or the recipient 602b (e.g., by memory 272 of the client device). Entries in the IM log may be ordered, deleted, edited, and/or otherwise managed by the host 604, the sender 602a, and/or the recipient 602b. For example, the host 604 may queue, order, and arrange entries in the IM log based on time, subscribers (e.g., screen names), topic, relevance, and/or any other ranking criteria.

Typically, each subscriber will have a corresponding IM log for recording IM activity of the subscriber. However, an IM log may be associated with a group of subscribers, or may simply be used to chronologically log activities of all subscribers communicating over or with the device used to maintain or store the log.

Updating the IM log may include recording the screen names of participants of an IM session. The sender 602a, the recipient 602b, and/or the host 604 may be configured to detect at least one identity (e.g., the screen names) associated with an instant message during an IM session, for example, by parsing the header information of an instant message. Typically, the screen names recorded in the IM log of a particular subscriber will be supplemented with information including the time the IM session was established and the screen names of other subscribers that participated in the IM session where several subscribers communicate using group IM. Updating the IM log also may include tracking the instant messages sent during an IM session and recording the time that each instant message was sent and received, recording the time the IM session was closed, and/or recording the time the sender 602a or the recipient 602b disconnected from the host 604.

A list of screen names for the most recent IM communications may be derived from the IM log automatically (step 638). The sender 602a, the recipient 602b, and/or the host 604 may be configured to derive such a list. For example, at any time, the last N different screen names with whom a particular subscriber has had an IM session may be determined from an updated IM log. The number N may be any predetermined number set according to preferences of the sender 602a, the recipient 602b, and/or the host 604, or it may be user-selectable.

In one implementation, the host 604 (e.g., profile server 5912 or IM server 5902) accesses an IM log associated with a particular subscriber that is stored on the host 604 (e.g., database 5914). The host 604 examines the IM log and creates a list of N different screen names based on an associated time or a relative position of each screen name. The associated time may be a time that an IM session was established, a time that an instant message was sent (or received), a time that an IM session was completed, a time that the sender 602a or the recipient 602b connected to or disconnected from the host 604, or some other time. Typically, the list of N screen names will be ordered with the most recent screen name being listed first.

The IM log (and/or the list of most recent IM contacts) may be configured to store only the last N different screen names with which a particular subscriber has had an IM session. The IM log may be maintained using a least recently used methodology. For example, when a new IM session is established, the screen name of each participant may be compared to the list of most recent IM contacts. If the screen name does not already appear in the list, the screen name is added and the least recent IM contact (i.e., oldest IM contact) is reduced in order or altogether removed from the list so that the list includes only N different screen names. If the screen name already appears in the list, the list is reordered so that the screen name appears at the top of the list. In either case, the updated list includes N different screen names listed in order of most recently used IM session. In some implementations, the list may be filtered to include only screen names that do not already appear on the subscriber's buddy list.

In another example, when an IM session is completed or when either the sender 602a or the recipient 602b disconnects from the host 604, the screen name of each participant may be compared to the list of most recent IM contacts. If the screen name does already appear in the list, the screen name is added and the least recent IM contact (i.e., oldest IM contact) is removed from the list if necessary to maintain only N different screen names on the list; otherwise, the least recent IM contact may be merely demoted. If the screen name already appears in the list, the list is reordered so that the screen name appears at the top of the list. In either case, the final list includes N different screen names listed in order of most recent IM session. In one implementation, the screen name of each participant may be compared to the list of most recent IM contacts only when an IM session is completed or only when either the sender 602a or the recipient 602b disconnects from the host 604 such that the list includes only the most recent IM contacts of the most recent closed IM sessions.

In another example, the IM log may be maintained using other methodologies, such as, for example a first-in first-out (FIFO) methodology. For example, when an new IM session is established, the screen name of each participant may be added to the list and the screen name first added to the list may be reduced in order or altogether removed from the list, whether or not it was the screen name least recently used actively in a conversation, thus maintaining the threshold number of different screen names. In some implementations, the list may be filtered to include only the screen names that do not already appear on the subscriber's list.

After a list of N different screen names is compiled, a user profile is accessed (step 640). In general, a user profile corresponds to a particular subscriber and may include, for example, the subscriber's buddy list, alert preferences, identified interests, and geographic location. The user profile of a subscriber may be stored and maintained on the host 604 (e.g., IM host 590, database 5914), the sender 602a (e.g., client device, memory 272), and/or the recipient 602b (e.g., client device, memory 272). In one implementation, portions of the user profile may be stored and maintained in several remote locations. Typically, a subscriber actively enters, edits and/or deletes the content of the user profile, for example, by using an installed IM client application to fill out an electronic form. In this case, however, access of the user profile may occur transparently to the subscriber. That is, the user profile is accessed without requiring any user action (e.g., selection or configuration by the subscriber). In one implementation, the host 604 (e.g., profile server 5912, IM server 5902) accesses the user profile. In other implementations, an installed IM client application is configured to transparently access a local user profile.

Then, the user profile is passively configured (step 642). That is, configuration occurs transparently to the subscriber and requires no subscriber action (e.g., selection by the subscriber). Configuration of the user profile may include the creating and/or modifying of a subscriber's user preferences, such as, for example, a buddy list, address book, calendar, notification settings (e.g., alerts), or any other personalized attributes associated with the subscriber.

In one implementation, a buddy list included in a subscriber's user profile is configured based on the updated IM log. In particular, a buddy list associated with at least one of the sender 602a and the recipient 602b may be passively configured to include a list of most recent contacts (step 642).

Figure 8:
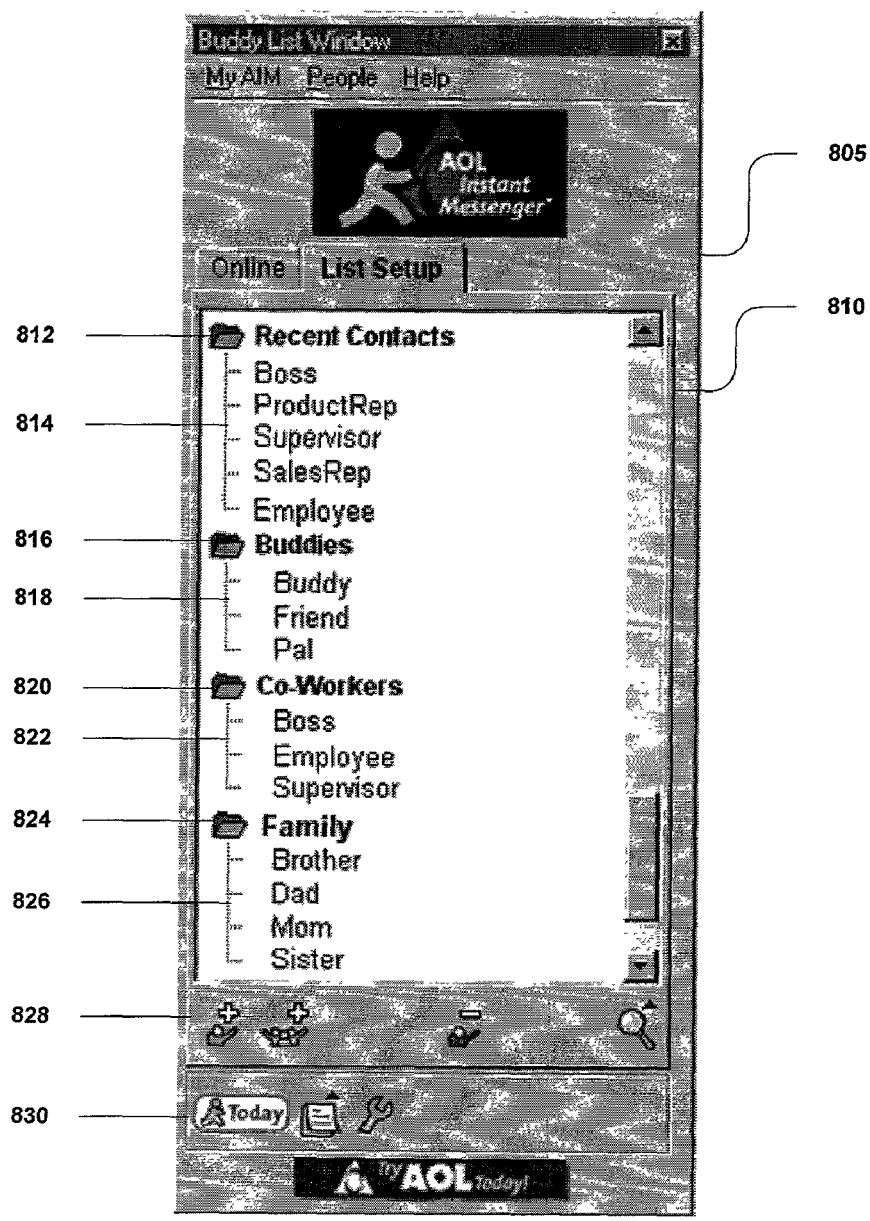

Referring to FIG. 8, a UI 800 that may be passively configured includes a Buddy List Window 805 having a List Setup box 810 (step 644 of FIG. 6). The List Setup box 810 includes one or more IM groups, for example, a Recent Contacts group 812, a Buddies group 816, a Co-Workers group 820, and a Family group 824. Each IM group includes one or more IM group members identified by screen name, for example, Recent Contacts group members 814, Buddies group members 818, Co-Workers group members 822, and Family group members 826. The List Setup box 810 also includes List Setup buttons 828 for performing IM functions such as adding a screen name, adding a group, deleting a screen name or group, and finding a screen name of a subscriber. The Buddy List Window 805 further includes Buddy List buttons 830 for performing IM functions such as linking to an IM-related web page, entering an away message, and setting IM-related user preferences.

In one implementation, the size of the IM groups may be limited to a threshold number of screen names, which may be independent of a size limit established for the entirety of the Buddy List in which it is included. Furthermore, specific IM groups may have different size limitations. For example, the Recent Contacts group 812 may be subject to the threshold number limitation on screen names and the Buddies group 816 may be subject to a different threshold number limitation of screen names, each of which may be different from a size limit of the Buddy List.

The IM groups may be actively or passively created, as discussed below. The Buddies group 816 may be a standard (or default) group provided with every installation of an IM client. In general, when a subscriber opens an IM account, the Buddies group 816 is created automatically. Initially, the Buddies group 816 is empty. To populate the Buddies group 816, a subscriber must actively enter a screen name for each person with whom the subscriber desires to communicate. For example, using the List Setup Buttons 828, a subscriber actively entered the screen name for each of the Buddies group members 818 (e.g., Buddy, Friend, Pal). In one implementation, the host 604 (e.g., IM host 590) provides a reverse lookup function that allows subscribers to search for screen names using various criteria of subscribers (e.g., name, location, e-mail address, interests).

The Co-Workers group 820 and the Family group 824 may be personalized groups actively created by the subscriber. In general, subscribers may personalize their buddy lists by creating different group and categorizing screen names. For example, using the List Setup Buttons 828, a subscriber can actively create the Co-Workers group 820 and the Family group 824. After the Co-Workers group 820 and the Family group 824 are created, the subscriber must actively enter a screen name for each of the Co-Workers group members 822 (e.g., Boss, Employee, Supervisor) and actively enter a screen name for each of the Family group members 826 (e.g., Brother, Dad, Mom, Sister). A screen name may occupy more than one personalized group.

Like the Buddies Group 816, the Recent Contacts group 812 may be a standard (or default) group provided with every installation of an IM client. In general, when a subscriber opens an IM account, the Recent Contacts group 812 is created automatically. Initially, the Recent Contacts group 812 is empty. However, unlike the Buddies group 816, a subscriber does not have to actively enter screen names to populate the Recent Contacts group 812. That is, the Recent Contacts group 812 is created and modified without user action (e.g., clicks, data entry). For example, screen names are added to and removed from the Recent Contacts group 814 as IM sessions are opened and closed, and/or as membership limits are imposed on the Recent Contacts group. As such, in one implementation, screen names are added to the Recent Contacts group 812 passively, as successful IM sessions are established with the subscriber, and these screen names may be removed from that group 812 as sessions are closed or maximum group size is reached. In another example, the screen name of each of the Recent Contacts group members 814 (e.g., Boss, ProductRep, Supervisor, SalesRep, Employee) is passively added to the Recent Contacts group 812 as successful IM session are closed with the subscriber or when either the sender 602a or the recipient 602b disconnects from the host 604.

In one implementation, the subscriber participates in an IM session with each of the Recent Contacts group members 814 in the following order: Employee, SalesRep, Supervisor, ProductRep, and Boss. As each IM session is established, a screen name for each of the Recent Contacts group members is added in sequence to the Recent Contacts group 812 resulting in the most recent contact being listed first. In this example, the order is implied from the visual hierarchy; however, numeric or other explicit visual indicators also may be used to make clear the relative order of recent IM sessions. Furthermore, in this example, it does not matter which subscriber initiates the IM session (i.e., who sent the initial instant message) or whether a response to the initial instant message is sent. However, the screen names may be ordered, separated into different groups, or otherwise differentiated to reflect this information. A screen name of a particular person is added whenever a successful IM session is established between the subscriber and the particular person. Screen names included in the Recent Contacts group 812 also may occupy other groups (e.g., Co-Workers group 820), or, alternatively, the Recent Contacts group 812 may include only the screen name of a particular person that is not included in select or all other groups.

In another implementation, as each IM session is completed or when either the sender 602a or the recipient 602b disconnects from the host 604, a screen name for each of the Recent Contacts group members is added in sequence to the Recent Contacts group 812 resulting in the most recent contact being listed first. A screen name of a particular person is added whenever a successful IM session is closed between the subscriber and the particular person or when either subscriber disconnects from the host. In this example, it does not matter which subscriber closed the IM session (e.g., who closed the IM window, who disconnected from the host) or which subscriber disconnected from the host. However, the screen names may be ordered, separated into different groups, or otherwise so differentiated to reflect this information.

Figure 9:
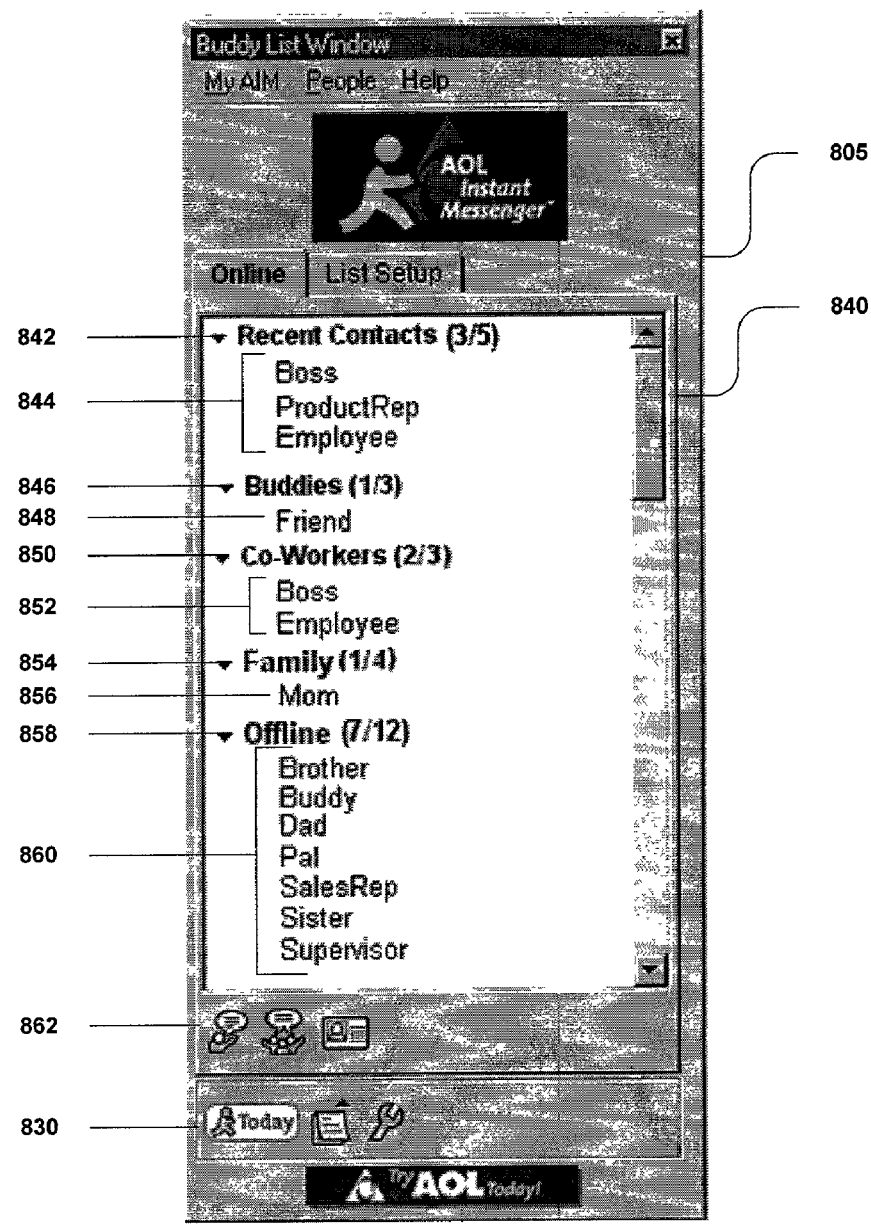

Referring to FIG. 9, a UI 900 that may be passively configured includes a Buddy List Window 805 having an Online box 840 (step 644 of FIG. 6). In general, the Online box 840 displays the online status and capabilities of certain screen names identified by the subscriber in the List Setup box, for example, List Setup box 810 of FIG. 8. In one implementation, the host 604 (e.g., IM host 590, IM server 5902) informs the sender 602*a* (e.g., client device, IM client application) whether the subscribers associated with the screen names are online, i.e., currently accessing the host 604.

The Online box 840 includes one or more online lists, with each list corresponding to an IM group. For example, the Online box 840 includes a Recent Contacts list 842, a Buddies list 846, a Co-Workers list 850, and a Family list 854. Each online list includes one or more screen names corresponding to IM group members that currently are online. In the implementation of FIG. 9, the Recent Contacts list 842 identifies certain online Recent Contacts members 844, the Buddies list 846 identifies a certain online Buddies member 846, the Co-Workers list 850 identifies certain online Co-Workers members 852, and the Family list 854 identifies a certain online Family member 856. The Online box 840 also includes an Offline list 858 identifying offline members 860 from one or more of the IM groups separately (not shown) or collectively. The Online box 840 further includes Online buttons 862 for performing IM functions such as displaying an IM window, sending an invitation to enter a chat room, and finding profile information associated with a screen name.

Figure 10:
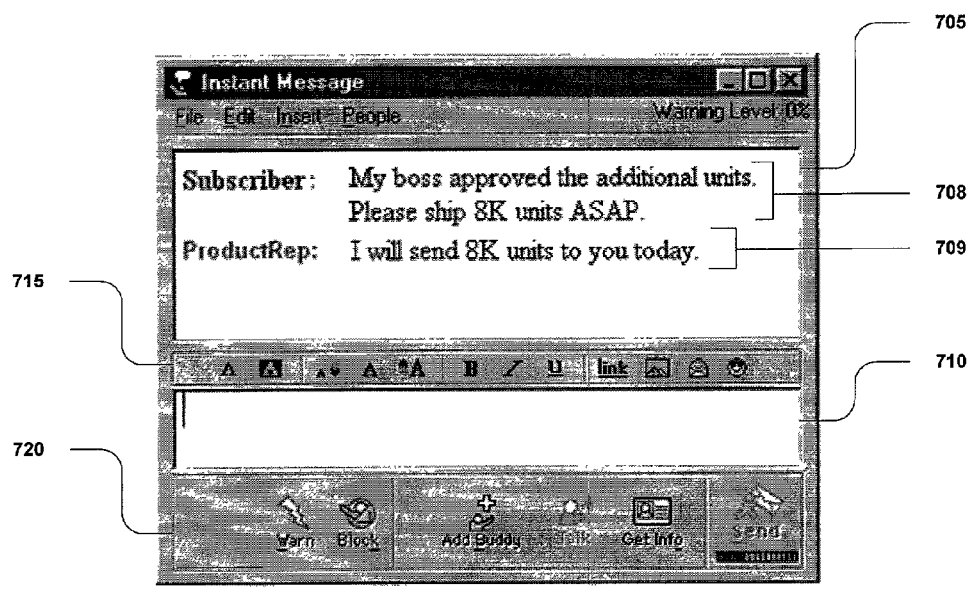

The Online box 840 facilitates IM communication between subscribers. For example, a subscriber can activate a pre-addressed IM window simply by clicking the screen name of an online group member. Referring to FIG. 10, a UI 1000 that may be invoked using the buddy list and displayed to the sender 602*a* and/or the recipient 602*b* includes an IM window 705 including a running transcript of an IM session and a text message area 710 for entering the text of an instant message, an IM toolbar 715, and IM buttons 720. In this example, the IM session includes a first instant message 708 from a first subscriber having a first screen name (Subscriber) and second instant message 709 from a second subscriber having a second screen name (ProductRep). The first subscriber may be associated with the sender 602*a* and the second subscriber may be associated with the recipient 602*b*.

Figure 11:
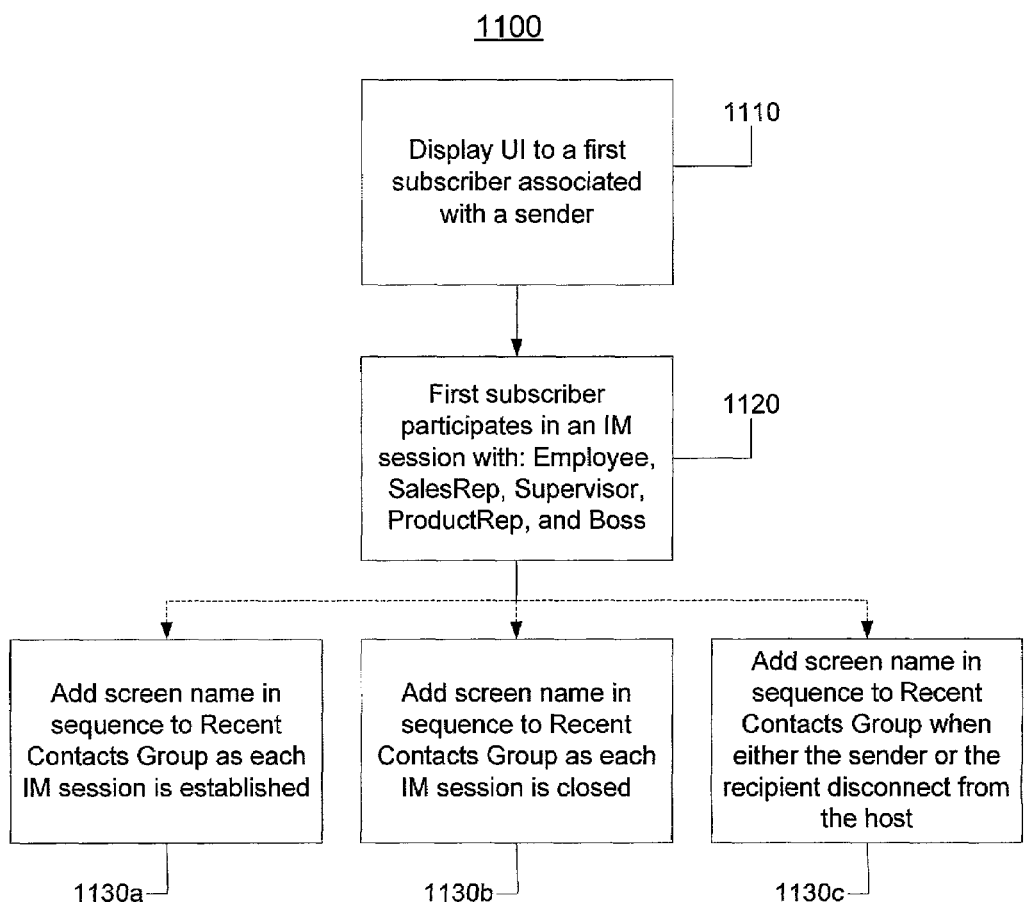
FIG. 11 is a flow chart of a communications method implemented by the communications system of FIGS. 1-5.

Referring to FIG. 11, in one implementation, the UI 1000 is displayed to a first subscriber associated with a sender 602*a* as follows (step 1110). First, the first subscriber participates in an IM session with each of the Recent Contacts group members 814 in the following order: Employee, SalesRep, Supervisor, ProductRep, and Boss (step 1120). As each IM session is established, a screen name for each of the Recent Contacts group members is added in sequence to the Recent Contacts group 812 resulting in the most recent contact being listed first (step 1130*a*). Additionally and/or alternatively, as each IM session is closed (step 1130*b*), or when either the sender or the recipient disconnect from the host (step 1130*c*), a screen name for each of the Recent Contacts group members is added in sequence to the Recent Contacts group 812 resulting in the most recent contact being listed first. Screen names included in the Recent Contacts group 812 also may occupy other groups (e.g., Co-Workers group 820). In one implementation, the Recent Contacts group 812 only may include the screen name of a particular person that is not included in any other group.

Next, the first subscriber views a UI 900 indicating the online status of an intended recipient of an instant message. In this example, the first subscriber intends to send an instant message to the second subscriber. Here, the screen name of the second subscriber (ProductRep) was not actively added to the UI 900 by the first subscriber. Rather, the screen name (ProductRep) was added passively to the Recent Contacts group 812 when the first subscriber and second subscriber established a prior successful IM session. By viewing the UI 900 and, in particular, the Recent Contacts list 842, the first subscriber is notified that the second subscriber is online. Namely, the screen name of the second subscriber (ProductRep) appears as one of the online Recent Contact members 844.

The first subscriber then sends an instant message intended for the second subscriber by interacting with the UI 900. For example, the first subscriber can display an IM UI 1000 pre-addressed to the second subscriber by clicking the screen name of the second subscriber (ProductRep) in the Recent Contacts list 842. The first subscriber enters the first instant message 708 into the text message area 710 and clicks one of the IM buttons 720, namely the send button. Finally, the first subscriber displays the second instant message 709 (i.e., the reply from the second subscriber) in the IM window 705.

Passively configuring a user profile, and hence a passively configured subscriber buddy list, benefits subscribers by facilitating IM communication. For example, a subscriber can view the online status of and create pre-addressed instant messages to recent IM contacts. This feature is particularly helpful to new IM users who would otherwise have to spend time and effort setting user preferences and entering data. Additionally, it is helpful to subscribers who accidentally or intentionally close sessions with IM contacts for whom they have no other record of their screen name, only to need that screen name for later IM contact. The persistent state of the recent IM contacts list enables the list to persist through log-outs and power downs.

Additionally, a passively configured user profile, and hence a passively configured subscriber buddy list, may be made accessible through any of several different devices independent of the device that was being used at the time of the IM session that resulted in the passive addition of or status change with respect to the IM contact in the Recent Contacts Group. For example, in a client-host model, the profile may be stored at the host or some other location centrally accessible to various client devices operable by the subscriber. As a result, a first subscriber may participate in an instant messaging session with a using a personal computer. At the end of the instant messaging session, the screen name of the second subscriber may be passively added to the first subscriber's Recent Contacts Group. When the first subscriber later uses a PDA and accesses an IM application, the first subscriber's Recent Contacts Group may be presented on the PDA. In this instance, the Recent Contacts Group includes the screen name of the second subscriber that was added to the group based on the IM session that the first subscriber participated in using the personal computer. This enables the first subscriber to initiate another IM session with the second subscriber by selecting the second subscriber's screen name from the Recent Contacts Group presented on the PDA. Thus, the passively configured buddy list, specifically the Recent Contact Group, persists across different devices.

A number of implementations have been described. Nevertheless, it will be understood that various modifications may be made. In other implementations, for example, other groups (e.g., Frequent Contacts, Popular Contacts) may be passively created and maintained in a persistent state in order to facilitate instant messaging. In yet other implementations, for example, other groups and lists may be passively created and maintained in a persistent state in order to facilitate instant messaging including: instant messages received; knock-knocks received (i.e., instant messages received from unknown identities), but accepted and/or declined; instant messages sent without receiving a response; instant messages sent to Buddies; instant messages sent to non-Buddies; instant messaging sessions where at least a threshold number of messages have been exchanged; and instant messages received to the exclusion of knock-knocks.

Other implementations are within the scope of the following claims.

What is claimed is:

1. A method of personalizing communications, the method comprising:
    accessing status information for instant messaging sessions involving an instant messaging identity;
    maintaining, on behalf of the instant messaging identity, a list of other instant messaging identities that is configured to enable the instant messaging identity to monitor the on-line presence of the other instant messaging identities and to initiate instant messaging sessions with the other instant messaging identities;
    distinguishing, based on information within the accessed status information that reveals recent participation with the instant messaging identity during instant messaging sessions, a set of participant identities who recently participated in instant messaging sessions with the instant messaging identity;
    identifying, from among the set of participant identities who recently participated in instant messaging sessions with the instant messaging identity, at least one participant identity who is not otherwise included in the list of other instant messaging identities maintained on behalf of the instant messaging identity; and
    passively configuring a group of instant messaging identities maintained within the list of other instant messaging identities maintained on behalf of the instant messaging identity to reflect that at least some of the participant identities from the set of participant identities recently participated in instant messaging sessions with the instant messaging identity, wherein passively configuring the group includes adding, to the group, the at least one participant identity identified as not otherwise being included in the list of other instant messaging identities maintained on behalf of the instant messaging identity.

2. The method as in claim 1 wherein passively configuring the group includes configuring the group without action from the instant messaging identity.

3. The method as in claim 1 wherein passively configuring the group includes maintaining the passively configured beyond logout of the instant messaging identity.

4. The method as in claim 1 wherein passively configuring the group includes retaining the set of participant identities within the group after an instant messaging session with the instant messaging identity is terminated.

5. The method as in claim 1 wherein passively configuring the group includes retaining the set of participant identities within the group independent of a device used for the instant messaging sessions during which the group was passively configured such that the passively configured group is accessible from one or more different devices.

6. The method as in claim 1 wherein passively configuring the group includes adding a screen name of a participant identity to the group only when an instant messaging session with the participant identity is closed.

7. The method as in claim 1 wherein passively configuring the group includes adding a screen name of a participant identity to the group only when an instant messaging session with the participant identity is closed and the screen name of the participant identity is not already included in the group.

8. The method as in claim 1 wherein passively configuring the group includes adding a screen name of a participant identity to the group when an instant messaging session with the participant identity is established.

9. The method as in claim 1 wherein passively configuring the group includes adding a screen name of a participant identity to the group when an instant messaging session with the participant identity is established and the screen name of the participant identity is not already included in the group.

10. The method in claim 1 wherein passively configuring the group includes limiting the group to exclude participant identities from which an instant message is received but not accepted.

11. The method as in claim 1 wherein passively configuring the group includes adding a screen name of a participant identity to the group from which an instant message is received but not accepted.

12. The method as in claim 1 wherein passively configuring the group includes configuring the group such that the group includes participant identities that included on at least one other list for the instant messaging identity.

13. The method as in claim 1 wherein passively configuring the group includes passively configuring the group such that a size of the group is limited.

14. The method as in claim 1 wherein passively configuring the group includes establishing a size of the group based on a selection by the instant messaging identity.

15. The method as in claim 1 wherein passively configuring the group includes initially establishing a size of the group based on a default value.

16. The method as in claim 1 wherein passively configuring the group includes sequencing participant identities within the group using a least recently used methodology.

17. The method as in claim 1 wherein passively configuring the group includes sequencing participant identities within the group using a first-in first-out methodology.

18. The method as in claim 1 wherein passively configuring the group includes arranging participant identities within the group such that a most recent participant identity is listed first.

19. The method as in claim 1 wherein passively configuring the group includes arranging participant identities within the group such that a least recently used participant identity is omitted whether or not the least recently used participant identity was first-in within the group.

20. The method as in claim 1 further comprising displaying the passively configured group.

21. The method as in claim 20 wherein displaying the group includes displaying an online status for each participant identity in the group.

22. The method as in claim 1 further comprising updating a log associated with the instant messaging identity, the log including a chronological record of instant messaging characteristics, wherein passively configuring the group includes passively configuring the group based on the updated log.

23. The method as in claim 22 wherein updating the log includes recording a screen name of a participant identity from an instant messaging session.

24. The method as in claim 22 wherein updating the log includes recording a time when an instant messaging session is established.

25. The method as in claim 1 wherein passively configuring the group includes passively configuring the group to include only participant identities from the identified set of participant identities that recently participated in instant messaging sessions with the instant messaging identity.

26. The method as in claim 1 wherein passively configuring the group includes passively configuring the group to include only participant identities not otherwise included in the list of other instant messaging identities maintained on behalf of the instant messaging identity.

27. A system for personalizing communications, comprising:
a processor; and
a storage component that stores instructions that, when executed by the processor, cause the processor to:
access status information for instant messaging sessions involving an instant messaging identity;
maintain, on behalf of the instant messaging identity, a list of other instant messaging identities that is configured to enable the instant messaging identity to monitor the on-line presence of the other instant messaging identities and to initiate instant messaging sessions with the other instant messaging identities;
distinguish, based on information within the accessed status information that reveals recent participation with the instant messaging identity during instant messaging sessions, a set of participant identities who recently participated in instant messaging sessions with the instant messaging identity;
identify, from among the set of participant identities who recently participated in instant messaging sessions with the instant messaging identity, at least one participant identity who is not otherwise included in the list of other instant messaging identities maintained on behalf of the instant messaging identity; and
passively configure a group of instant messaging identities maintained within the list of other instant messaging identities maintained on behalf of the instant messaging identity to reflect that at least some of the participant identities from the set of participant identities recently participated in instant messaging sessions with the instant messaging identity, wherein the instructions that, when executed by the processor, cause the processor to passively configure the group include instructions that, when executed, cause the processor to add, to the group, the at least one participant identity identified as not otherwise being included in the list of other instant messaging identities maintained on behalf of the instant messaging identity.

28. The system of claim 27 wherein the instructions that, when executed by the processor, cause the processor to passively configure the group include instructions that, when executed by the processor, cause the processor to configure the group without action from the instant messaging identity.

29. The system of claim 27 wherein the instructions that, when executed by the processor, cause the processor to passively configure the group include instructions that, when executed by the processor, cause the processor to maintain the passively configured group beyond logout of the instant messaging identity.

30. The system of claim 27 wherein the instructions that, when executed by the processor, cause the processor to passively configure the group include instructions that, when executed by the processor, cause the processor to retain the participant identities within the group after an instant messaging session with the instant messaging identity is terminated.

31. The system of claim 27 wherein the instructions that, when executed by the processor, cause the processor to passively configure the group include instructions that, when executed by the processor, cause the processor to retain the participant identities within the group independent of a device used for the instant messaging sessions during which the group was passively configured such that the passively configured group is accessible from one or more different devices.

32. The system of claim 27 wherein the instructions that, when executed by the processor, cause the processor to passively configure the group include instructions that, when executed by the processor, cause the processor to add a screen name of a participant identity to the group only when an instant messaging session with the participant identity is closed.

33. The system of claim 27 wherein the instructions that, when executed by the processor, cause the processor to passively configure the group include instructions that, when executed by the processor, cause the processor to add a screen name of a participant identity to the group only when an instant messaging session with the participant identity is closed and the screen name of the participant identity is not already included in the group.

34. The system of claim 27 wherein the instructions that, when executed by the processor, cause the processor to passively configure the group include instructions that, when executed by the processor, cause the processor to add a screen name of a participant identity to the group when an instant messaging session with the participant identity is established.

35. The system of claim 27 wherein the instructions that, when executed by the processor, cause the processor to passively configure the group include instructions that, when executed by the processor, cause the processor to add a screen name of a participant identity to the group when an instant messaging session with the participant identity is established and the screen name of the participant identity is not already included in the group.

36. The system of claim 27 wherein the instructions that, when executed by the processor, cause the processor to passively configure the group include instructions that, when executed by the processor, cause the processor to limit the group to exclude participant identities from which an instant message is received but not accepted.

37. The system of claim 27 wherein the instructions that, when executed by the processor, cause the processor to passively configure the group include instructions that, when executed by the processor, cause the processor to add a screen name of a participant identity to the group from which an instant message is received but not accepted.

38. The system of claim 27 wherein the instructions that, when executed by the processor, cause the processor to passively configure the group include instructions that, when executed by the processor, cause the processor to configure the group such that the group includes participant identities that are included on at least one other list for the instant messaging identity.

39. The system of claim 27 wherein the instructions that, when executed by the processor, cause the processor to passively configure the group include instructions that, when executed by the processor, cause the processor to passively configure the group such that a size of the group is limited.

40. The system of claim 27 wherein the instructions that, when executed by the processor, cause the processor to passively configure the group include instructions that, when executed by the processor, cause the processor to establish a size of the group based on a selection by the instant messaging identity.

41. The system of claim 27 wherein the instructions that, when executed by the processor, cause the processor to passively configure the group include instructions that, when executed by the processor, cause the processor to initially establish a size of the group based on a default value.

42. The system of claim 27 wherein the instructions that, when executed by the processor, cause the processor to passively configure the group include instructions that, when executed by the processor, cause the processor to sequence participant identities within the group using a least recently used methodology.

43. The system of claim 27 wherein the instructions that, when executed by the processor, cause the processor to configure the group include instructions that, when executed by the processor, cause the processor to sequence the participant identities within the group using a first-in first-out methodology.

44. The system of claim 27 wherein the instructions that, when executed by the processor, cause the processor to passively configure the group include instructions that, when executed by the processor, cause the processor to arrange participant identities within the group such that a most recent participant identity is listed first.

45. The system of claim 27 wherein the instructions that, when executed by the processor, cause the processor to passively configure the group include instructions that, when executed by the processor, cause the processor to arrange participant identities within the group such that a least recently used participant identity is omitted whether or not the least recently used participant identity was first-in within the group.

46. The system of claim 27 wherein the storage component further stores instructions that, when executed by the processor, cause the processor to display the passively configured group.

47. The system of claim 46 wherein the instructions that, when executed by the processor, cause the processor to display the group include instructions that, when executed by the processor, cause the processor to display an online status for each participant identity in the group.

48. The system of claim 27 wherein the storage component further stores instructions that, when executed by the processor, cause the processor to update a log associated with the instant mess aging identity, the log including a chronological record of instant messaging characteristics, wherein the instructions that, when executed by the processor, cause the processor to passively configure the group include instructions that, when executed by the processor, cause the processor to passively configure the group based on the updated log.

49. The system of claim 48 wherein the instructions that, when executed by the processor, cause the processor to update the log include instructions that, when executed by the processor, cause the processor to record a screen name of a participant identity from an instant messaging session.

50. The system of claim 48 wherein the instructions that, when executed by the processor, cause the processor to update the log include instructions that, when executed by the processor, cause the processor to record a time when an instant messaging session is established.

51. A tangible computer readable storage medium storing a computer program for personalizing communications, comprising:
an accessing code segment that causes a computer to access status information for instant messaging sessions involving an instant messaging identity;
a maintaining code segment that causes the computer to maintain, on behalf of the instant messaging identity, a list of other instant messaging identities that is configured to enable the instant messaging identity to monitor the on-line presence of the other instant messaging identities and to initiate instant messaging sessions with the other instant messaging identities;
an distinguishing code segment that causes the computer to distinguish, based on information within the accessed status information that reveals recent participation with the instant messaging identity during instant messaging sessions, a set of participant identities who recently participated in instant messaging sessions with the instant messaging identity;
an identifying code segment that causes the computer to identify, from among the set of participant identities who recently participated in instant messaging sessions with the instant messaging identity, at least one participant identity who is not otherwise included in the list of other instant messaging identities maintained on behalf of the instant messaging identity; and
a configuration code segment that causes the computer to passively configure a group of instant messaging identities maintained within the list of other instant messaging identities maintained on behalf of the instant messaging identity to reflect that at least some of the participant identities from the set of participant identities recently participated in instant messaging sessions with the instant messaging identity, wherein the configuration code segment causes the computer to acid, to the group, the at least one participant identity identified as not otherwise being included in the list of other instant messaging identities maintained on behalf of the instant messaging identity.

52. The tangible computer readable storage medium of claim 51 wherein the configuration code segment causes the computer to configure the group without action from the instant messaging identity.

53. The tangible computer readable storage medium of claim 51 wherein the configuration code segment causes the computer to maintain the group beyond logout of the instant messaging identity.

54. The tangible computer readable storage medium of claim 51 wherein the configuration code segment causes the computer to retain the participant identities within the group after an instant messaging session with the instant messaging identity is terminated.

55. The tangible computer readable storage medium of claim 51 wherein the configuration code causes the computer to retain the participant identities within the group independent of a device used for the instant messaging sessions during which the group was passively configured such that the passively configured group is accessible from one or more different devices.

56. The tangible computer readable storage medium of claim 51 wherein the configuration code segment causes the computer to add a screen name of a participant identity to the group only when an instant messaging session with the participant identity is closed.

57. The tangible computer readable storage medium of claim 51 wherein the configuration code segment causes the computer to add a screen name of a participant identity to the group only when an instant messaging session with the participant identity is closed and the screen name of the participant identity is not already included in the group.

58. The tangible computer readable storage medium of claim 51 wherein the configuration code segment causes the computer to add a screen name of a participant identity to the group when an instant messaging session with the participant identity is established.

59. The tangible computer readable storage medium of claim 51 wherein the configuration code segment causes the computer to add a screen name of a participant identity to the group when an instant messaging session with the participant identity is established and the screen name of the participant identity is not already included in the group.

60. The tangible computer readable storage medium of claim 51 wherein the configuration code segment causes the computer to limit the group to exclude participant identities from which an instant message is received but not accepted.

61. The tangible computer readable storage medium of claim 51 wherein the configuration code segment causes the computer to add a screen name of a participant identity to the group from which an instant message is received but not accepted.

62. The tangible computer readable storage medium of claim 51 wherein the configuration code segment causes the computer to configure the group such that the group includes participant identities that are included on at least one other list for the instant messaging identity.

63. The tangible computer readable storage medium of claim 51 wherein the configuration code segment causes the computer to passively configure the group such that a size of the group is limited.

64. The tangible computer readable storage medium of claim 51 wherein the configuration code segment causes the computer to establish a size of the group based on a selection by the instant messaging identity.

65. The tangible computer readable storage medium of claim 51 wherein the configuration code segment causes the computer to initially establish a size of the group based on a default value.

66. The tangible computer readable storage medium of claim 51 wherein the configuration code segment causes the computer to sequence participant identities within the group using a least recently used methodology.

67. The tangible computer readable storage medium of claim 51 wherein the configuration code segment causes the computer to sequence participant identities within the group using a first-in first-out methodology.

68. The tangible computer readable storage medium of claim 51 wherein the configuration code segment causes the computer to arrange participant identities within the group such that a most recent participant identity is listed first.

69. The tangible computer readable storage medium of claim 51 wherein the configuration code segment causes the computer to arrange participant identities within the group such that a least recently used participant identity is omitted whether or not the least recently used participant identity was first-in on the group of participant identities.

70. The tangible computer readable storage medium of claim 51 further comprising a displaying code segment that causes the computer to display the passively configured group.

71. The tangible computer readable storage medium of claim 70 wherein the displaying code segment causes the computer to display an online status for each participant identity in the group.

72. The tangible computer readable storage medium of claim 51 further comprising an updating code segment that causes the computer to update a log associated with the instant messaging identity, the log including a chronological record of instant messaging characteristics, wherein the configuration code segment causes the computer to passively configure the group based on the updated log.

73. The tangible computer readable storage medium of claim 72 wherein the updating code segment causes the computer to record a screen name of a participant identity from an instant messaging session.

74. The tangible computer readable storage medium of claim 72 wherein the updating code segment causes the computer to record a time when an instant messaging session is established.

75. A method comprising:
maintaining, for an instant messaging identity, a collection of other instant messaging identities;
causing a display, to the instant messaging identity, of an instant messaging graphical user interface that includes representations of instant messaging identities from the collection of other instant messaging identities, the displayed representations of the other instant messaging identities being configured to enable the instant messaging identity to initiate instant messaging sessions with the instant messaging identities that correspond to the displayed representations;
with respect to each of the other instant messaging identities that correspond to the displayed representations, reflecting information about a present availability to communicate with the instant messaging identity using at least instant messaging;
maintaining a log for tracking instant messaging activity of the instant messaging identity, the log including records of instant messaging sessions between the instant messaging identity and other participant identities;
identifying, based on the log, a subset of the participant identities that participated in instant messaging sessions with the instant messaging identity recently relative to other of the participant identities, the identified subset including an individual participant identity that is not already included in the collection of other instant messaging identities maintained for the instant messaging identity; and
based on having identified the subset of the participant identities that participated in instant messaging sessions with the instant messaging identity recently relative to other of the participant identities, passively triggering an updating of the displayed instant messaging graphical user interface to make perceivable that one or more of the identified subset of participant identities participated in instant messaging sessions with the instant messaging identity recently relative to other of the participant identities, including triggering an addition of a representation of the individual participant identity to the displayed instant messaging graphical user interface and an updating of the displayed instant messaging graphical user interface to make perceivable that the individual participant identity participated in an instant messaging session with the instant messaging identity recently relative to other of the participant identities.

76. The method of claim 75 wherein identifying the subset of the participant identities that participated in instant messaging sessions with the instant messaging identity recently relative to other of the participant identities comprises limiting the subset of participant identities that participated in instant messaging sessions with the instant messaging identity recently relative to other of the participant identities to a threshold number of participant identities such that the subset of the participant identities includes no more than a threshold number of participant identities with whom the instant messaging identity has participated in instant messaging sessions recently relative to other of the participant identities.

77. The method of claim 75 wherein:
causing a display of an instant messaging graphical user interface that includes representations of instant messaging identities from the collection of other instant messaging identities comprises causing a display of an instant messaging graphical user interface that includes a recent contacts group of participant identities; and
passively triggering an updating of the displayed instant messaging graphical user interface to make perceivable that one or more of the identified subset of participant identities participated in instant messaging sessions with the instant messaging identity recently relative to other of the participant identities comprises populating the recent contacts group with one or more representations corresponding to one or more of the participant identities that participated in instant messaging sessions with the instant messaging identity recently relative to other of the participant identities.

78. The method of claim 77 wherein:
identifying a subset of the participant identities that participated in instant messaging sessions with the instant messaging identity recently relative to other of the participant identities comprises determining, based on the log, a relative chronological order of the instant messaging sessions between the instant messaging identity and the participant identities that participated in instant messaging sessions with the instant messaging identity recently relative to other of the participant identities; and
populating the recent contacts group comprises ordering the representations of the participant identities included in the recent contacts group to reflect the relative chronological order of the instant messaging sessions between the instant messaging identity and the participant identities that participated in instant messaging sessions with the instant messaging identity recently relative to other of the participant identities.

79. The method of claim 78 wherein:
determining a relative chronological order of the instant messaging sessions between the instant messaging identity and the participant identities that participated in instant messaging sessions with the instant messaging identity recently relative to other of the participant identities comprises determining a particular participant identity with whom the instant messaging identity participated in an instant messaging session most recently; and
ordering the representations of the participant identities included in the recent contacts group to reflect the relative chronological order of the instant messaging sessions between the instant messaging identity and the participant identities that participated in instant messaging sessions with the instant messaging identity recently relative to other of the participant identities comprises promoting a representation of the particular participant identity with whom the instant messaging identity participated in an instant messaging session most recently to a first relative position among the representations of the participant identities included in the recent contacts group.

80. The method of claim 79 further comprising:
establishing an instant messaging session between the instant messaging identity and a new participant identity;
updating the log to reflect the instant messaging session between the instant messaging identity and the new participant identity;
determining that the new participant identity participated in an instant messaging session with the instant messaging identity more recently than the particular participant identity;
in response to determining at least that the new participant identity participated in an instant messaging session with the instant messaging identity more recently than the particular participant identity, promoting a representation of the new participant identity to the first relative position among the representations of the participant identities included in the recent contacts collection and demoting the representation of the particular participant identity to a second relative position among the representations of the participant identities included in the recent contacts collection.

81. The method of claim 78 wherein:
determining a relative chronological order of the instant messaging sessions between the instant messaging identity and the participant identities that participated in instant messaging sessions with the instant messaging identity recently relative to other of the participant identities comprises determining a relative chronological order of the instant messaging sessions based on a relative order of initiation of the instant messaging sessions between the instant messaging identity and the participant identities that participated in instant messaging sessions with the instant messaging identity recently relative to other of the participant identities; and
ordering the representations of the participant identities included in the recent contacts group to reflect the relative chronological order of the instant messaging sessions between the instant messaging identity and the participant identities that participated in instant messaging sessions with the instant messaging identity recently relative to other of the participant identities comprises ordering the representations of the participant identities included in the recent contacts group based on the relative order of initiation of the instant messaging sessions between the instant messaging identity and the participant identities that participated in instant messaging sessions with the instant messaging identity recently relative to other of the participant identities.

82. The method of claim 78 wherein:
determining a relative chronological order of the instant messaging sessions between the instant messaging identity and the participant identities that participated in instant messaging sessions with the instant messaging identity recently relative to other of the participant identities comprises determining a relative chronological order of the instant messaging sessions based on a relative order of termination of the instant messaging sessions between the instant messaging identity and the participant identities that participated in instant messaging sessions with the instant messaging identity recently relative to other of the participant identities; and
ordering the representations of the participant identities included in the recent contacts group to reflect the chronological order of the instant messaging sessions between the instant messaging identity and the participant identities that participated in instant messaging sessions with the instant messaging identity recently relative to other of the participant identities comprises ordering the representations of the participant identities included in the recent contacts group based on the relative order of termination of the instant messaging sessions between the instant messaging identity and the participant identities that participated in instant messaging sessions with the instant messaging identity recently relative to other of the participant identities.

83. The method of claim 78 further comprising:

establishing an instant messaging session between the instant messaging identity and a particular participant identity;

updating the log to reflect the instant messaging session between the instant messaging identity and the particular participant identity;

determining, based on the updated log, that the particular participant identity participated in an instant messaging session with the instant messaging identity more recently than other participant identities included in the recent contacts group;

determining if a representation of the particular participant identity already is included in the recent contacts group; and based on a determination that the representation of the particular participant identity already is included in the recent contacts group, reordering the representations of the participant identities included in the recent contacts group to reflect that the particular participant identity participated in an instant messaging session with the instant messaging identity more recently than the other participant identities for whom representations are included in the recent contacts group.

84. The method of claim 83 wherein:

reordering the representations of the participant identities in the recent contacts group to reflect that the particular participant identity participated in an instant messaging session with the instant messaging identity more recently than the other participant identities for whom representations are included in the recent contacts group comprises removing the representation of the particular participant identity from a current position among the representations of participant identities included in the recent contacts group and promoting the representation of the particular participant identity to a first relative position among the representations of the participant identities in the recent contacts group.

85. The method of claim 77 wherein at least one of the instant sessions between the instant messaging identity and the participant identities that participated in instant messaging sessions with the instant messaging identity recently relative to other of the participant identities was initiated by a participant identity such that:

identifying a subset of the participant identities that participated in instant messaging sessions with the instant messaging identity recently relative to other of the participant identities comprises identifying a subset of the participant identities that participated in instant messaging sessions with the instant messaging identity recently relative to other of the participant identities that includes a participant identity that initiated an instant messaging session with the instant messaging identity; and populating the recent contacts group comprises populating the recent contacts group with a representation of a participant identity that initiated an instant messaging session with the instant messaging identity.

86. The method of claim 85 wherein the instant messaging identity did not send a responsive communication to the at least one instant messaging session that was initiated by a participant identity such that:

identifying a subset of the participant identities that participated in instant messaging sessions with the instant messaging identity recently relative to other of the participant identities comprises identifying a subset of the participant identities that participated in instant messaging sessions with the instant messaging identity recently relative to other of the participant identities that includes a participant identity that initiated an instant messaging session with the instant messaging identity despite the fact that the instant messaging identity did not send a responsive communication to the instant messaging session initiated by the participant identity; and populating the recent contacts group comprises populating the recent contacts group with a representation of a participant identity that initiated an instant messaging session with the instant messaging identity despite the fact that the instant messaging identity did not send a responsive communication to the instant messaging session initiated by the participant identity.

87. The method of claim 78 further comprising:

establishing an instant messaging session between the instant messaging identity and a particular participant identity;

updating the log to reflect the instant messaging session between the instant messaging identity and the particular participant identity;

determining if a representation of the particular participant identity already is included in the recent contacts group;

based on a determination that a representation of the particular participant identity is not already included in the recent contacts group, adding a representation of the participant identity to the recent contacts group.

88. The method of claim 78 further comprising:

establishing an instant messaging session between the instant messaging identity and a particular participant identity;

updating the log to reflect the instant messaging session between the instant messaging identity and the particular participant identity;

determining if a representation of the particular participant identity already is included in the recent contacts group; and based on a determination that a representation of the particular participant identity already is included in the recent contacts group, maintaining the recent contacts group in an unchanged state.

89. The method of claim 75 further comprising:

establishing an instant messaging session between the instant messaging identity and a particular participant identity;

updating the log to reflect the instant messaging session between the instant messaging identity and the particular participant identity;

determining, from among the identified subset of the participant identities that participated in instant messaging sessions with the instant messaging identity recently relative to other of the participant identities, a participant identity that participated in an instant messaging session with the instant messaging identity least recently;

removing the participant identity determined to have participated in an instant messaging session with the instant messaging identity least recently from the subset of participant identities that participated in instant messaging sessions with the instant messaging identity recently relative to other of the participant identities, wherein populating the recent contacts group comprises removing a representation of the participant identity that participated in an instant messaging session with the instant messaging identity least recently from the recent contacts group.

90. The method of claim 75 further comprising determining whether participant identities from among the identified subset of participant identities that participated in instant messaging sessions with the instant messaging identity recently relative to other of the participant identities are currently on-line, wherein passively triggering an updating of the displayed instant messaging graphical user interface to make perceivable that one or more of the identified subset of participant identities participated in instant messaging sessions with the instant messaging identity recently relative to other of the participant identities comprises passively triggering an updating of the displayed instant messaging graphical user interface to make perceivable that one or more of the identified subset of participant identities participated in instant messaging sessions with the instant messaging identity recently relative to other of the participant identities and are currently on-line.

91. The method of claim 75 wherein passively triggering an updating of the displayed instant messaging graphical user interface to make perceivable that one or more of the identified subset of participant identities participated in instant messaging sessions with the instant messaging identity recently relative to other of the participant identities comprises automatically triggering, without user intervention, an updating of the displayed instant messaging graphical user interface to make perceivable that one or more of the identified subset of participant identities participated in instant messaging sessions with the instant messaging identity recently relative to other of the participant identities.

92. The method of claim 75 further comprising:
establishing an instant messaging session between the instant messaging identity and a particular participant identity;
updating the log to reflect the instant messaging session between the instant messaging identity and the particular participant identity;
updating the identified subset of participant identities that participated in instant messaging sessions with the instant messaging identity recently relative to other of the participant identities to include the particular participant identity; and
passively triggering another updating of the displayed instant messaging graphical user interface to make perceivable that the particular participant identity participated in an instant messaging session with the instant messaging identity recently relative to other of the participant identities.

93. The method of claim 75 further comprising:
determining that the individual participant identity is not already included in the collection of other instant messaging identities maintained for the instant messaging identity;
as a consequence of identifying the subset of the participant identities that participated in instant messaging sessions with the instant messaging identity recently relative to other of the participant identities and determining that the individual participant identity is not already included in the collection of other instant messaging identities maintained for the instant messaging identity, adding the individual participant identity to the collection of other instant messaging identities maintained for the instant messaging identity, wherein triggering an addition of a representation of the individual participant identity to the displayed instant messaging graphical user interface and an updating to make perceivable that the individual participant identity participated in an instant messaging session with the instant messaging identity recently relative to other of the participant identities includes triggering an addition of a representation of the individual participant identity to the displayed instant messaging graphical user interface and an updating to make perceivable that the individual participant identity participated in an instant messaging session with the instant messaging identity recently relative to other of the participant identities as a consequence of having determined that the individual participant identity is not already included in the collection of other instant messaging identities maintained for the instant messaging identity.

94. A communications system comprising:
a processor; and
a storage component that stores instructions that, when executed by the processor, cause the processor to:
maintain, for an instant messaging identity, a collection of other instant messaging identities;
cause a display, to the instant messaging identity, of an instant messaging graphical user interface that includes representations of instant messaging identities from the collection of other instant messaging identities, the displayed representations of the other instant messaging identities being configured to enable the instant messaging identity to initiate instant messaging sessions with the instant messaging identities that correspond to the displayed representations;
reflect, with respect to each of the other instant messaging identities that correspond to the displayed representations, information about a present availability to communicate with the instant messaging identity using at least instant messaging;
maintain, a log for tracking instant messaging activity of the instant messaging identity, the log including records of instant messaging sessions between the instant messaging identity and other participant identities;
identify, based on the log, a subset of the participant identities that participated in instant messaging sessions with the instant messaging identity recently relative to other of the participant identities, the identified subset including an individual participant identity that is not already included in the collection of other instant messaging identities maintained for the instant messaging identity; and
based on having identified the subset of the participant identities that participated in instant sessions with the instant messaging identity recently relative to other of the participant identities, passively trigger an updating of the displayed instant messaging graphical user interface to make perceivable that one or more of the identified subset participant identities participated in instant messaging sessions with the instant messaging identity recently relative to other of the participant identities, including trigger an addition of a representation of the individual participant identity to the displayed instant messaging graphical user interface and an updating of the displayed instant messaging graphical user interface to make perceivable that the individual participant identity participated in an instant messaging session with the instant messaging identity recently relative to other of the participant identities.

95. The communications system of claim 94 wherein:
the storage component further stores instructions that, when executed by the processor, cause the processor to:
  determine that the individual participant identity is not already included in the collection of other instant messaging identities maintained for the instant messaging identity; and
  add the individual participant identity to the collection of other instant messaging identities maintained for the instant messaging identity as a consequence of identifying the subset of the participant identities that participated in instant messaging sessions with the instant messaging identity recently relative to other of the participant identities and determining that the individual participant identity is not already included in the collection of other instant messaging identities maintained for the instant messaging identity; and
the instructions that, when executed by the processor, cause the processor to trigger an addition of a representation of the individual participant identity to the displayed instant messaging graphical user interface and an updating of the displayed instant messaging graphical user interface to make perceivable that the individual participant identity participated in an instant messaging session with the instant messaging identity recently relative to other of the participant identities include instructions that, when executed by the processor, cause the processor to trigger an addition of a representation of the individual participant identity to the displayed instant messaging graphical user interface and an updating of the displayed instant messaging graphical user interface to make perceivable that the individual participant identity participated in an instant messaging session with the instant messaging identity recently relative to other of the participant identities as a consequence of having determined that the individual participant identity is not already included in the collection of other instant messaging identities maintained for the instant messaging identity.

96. A tangible computer readable storage medium having embodied thereon a computer program, the computer program including instructions that, when executed, cause a computer to:
  maintain, for an instant messaging identity, a collection of other instant messaging identities;
  cause a display, to the instant messaging identity, of an instant messaging graphical user interface that includes representations of instant messaging identities from the collection of other instant messaging identities, the displayed representations of the other instant messaging identities being configured to enable the instant messaging identity to initiate instant messaging sessions with the instant messaging identities that correspond to the displayed representations;
  reflect, with respect to each of the other instant messaging identities that correspond to the displayed representations, information about a present availability to communicate with the instant messaging identity using at least instant messaging;
  maintain a log for tracking instant messaging activity of the instant messaging identity, the log including records of instant messaging sessions between the instant messaging identity and other participant identities;
  identify, based on the log, a subset of the participant identities that participated in instant messaging sessions with the instant messaging identity recently relative to other of the participant identities, the identified subset including an individual participant identity that is not already included in the collection of other instant messaging identities maintained for the instant messaging identity; and
  based on having identified the subset of the participant identities that participated in instant messaging sessions with the instant messaging identity recently relative to other of the participant identities, passively trigger an updating of the displayed instant messaging graphical user interface to make perceivable that one or more of the identified subset of participant identities participated in instant messaging sessions with the instant messaging identity recently relative to other of the participant identities, including trigger an addition of a representation of the individual participant identity to the displayed instant messaging graphical user interface and an updating of the displayed instant messaging graphical user interface to make perceivable that the individual participant identity participated in an instant messaging session with the instant messaging identity recently relative to other of the participant identities.

97. The tangible computer readable storage medium of claim 96 wherein:
the computer program further includes instructions that, when executed, cause a computer to:
  determine that the individual participant identity is not already included in the collection of other instant messaging identities maintained for the instant messaging identity; and
  add the individual participant identity to the collection of other instant messaging identities maintained for the instant messaging identity as a consequence of identifying the subset of the participant identities that participated in instant messaging sessions with the instant messaging identity recently relative to other of the participant identities and determining that the individual participant identity is not already included in the collection of other instant messaging identities maintained for the instant messaging identity; and
the instructions that, when executed, cause a computer to trigger an addition of a representation of the individual participant identity to the displayed instant messaging graphical user interface and an updating of the displayed instant messaging graphical user interface to make perceivable that the individual participant identity participated in an instant messaging session with the instant messaging identity recently relative to other of the participant identities include instructions that, when executed by the processor, cause the processor to trigger an addition of a representation of the individual participant identity to the displayed instant messaging graphical user interface and an updating of the displayed instant messaging graphical user interface to make perceivable that the individual participant identity participated in an instant messaging session with the instant messaging identity recently relative to other of the participant identities as a consequence of having determined that the individual participant identity is not already included in the collection of other instant messaging identities maintained for the instant messaging identity.

98. A computer-implemented method comprising:

receiving a request for an instant messaging identity be logged in to an instant messaging system;

in response to receiving the request for the instant messaging identity to be logged in to the instant messaging system, logging the instant messaging identity in to the instant messaging system;

as a consequence of logging the instant messaging identity in to the instant messaging system, enabling display of an instant messaging graphical user interface that includes a list of other instant messaging identities, the list of other instant messaging identities including a sub-group of instant messaging identities who are not otherwise listed within the list of other instant messaging identities and who have engaged in instant messaging sessions with the instant messaging identity recently relative to other users of the instant messaging system, the graphical user interface being configured to display on-line presence information for each of the other instant messaging identities, to enable the instant messaging identity to initiate instant messaging sessions with each of the other instant messaging identities, and to display the list of other instant messaging identities such that at least one listed instant messaging identity who is not included in the sub-group and at least one listed instant messaging identity who is included in the sub-group are visible concurrently;

while the instant messaging identity remains logged in to the instant messaging system, moderating an instant messaging session between the instant messaging identity and an unlisted instant messaging identity;

determining, based on moderating the instant messaging session between the instant messaging identity and the unlisted instant messaging identity, that the unlisted instant messaging identity has engaged in an instant messaging session with the instant messaging identity recently relative to other users of the instant messaging system;

determining that the unlisted instant messaging identity is not included within the list of other instant messaging identities; and as a consequence of having determined that the unlisted instant messaging identity has engaged in an instant messaging session with the instant messaging identity recently relative to other users of the instant messaging system and that the unlisted instant messaging identity is not included within the list of other instant messaging identities, causing the displayed graphical user interface to be updated to include the unlisted instant messaging identity within the sub-group of instant messaging identities who are not otherwise listed within the list of other instant messaging identities and who have engaged in instant messaging sessions with the instant messaging identity recently relative to other users of the instant messaging system without otherwise including the unlisted instant messaging identity within the list of other instant messaging identities.

* * * * *

UNITED STATES PATENT AND TRADEMARK OFFICE
CERTIFICATE OF CORRECTION

PATENT NO. : 7,765,484 B2
APPLICATION NO. : 10/134437
DATED : July 27, 2010
INVENTOR(S) : James A. Roskind Page 1 of 1

It is certified that error appears in the above-identified patent and that said Letters Patent is hereby corrected as shown below:

On the Title page, Item (54), and Col. 1, "PASSIVE PERSONALIZATION OF LISTS" should read -- PASSIVE PERSONALIZATION OF BUDDY LISTS --.

In claim 12, column 22, line 32, "that included" should read -- that are included --.

In claim 51, column 26, line 36, "acid" should read -- add --.

Signed and Sealed this

Fifth Day of October, 2010

David J. Kappos
*Director of the United States Patent and Trademark Office*